United States Patent
Lewis et al.

(10) Patent No.: US 11,396,222 B2
(45) Date of Patent: Jul. 26, 2022

(54) SOFT FRONT COCKPIT COVER WITH UNCONNECTED 2 BOW SYSTEM

(71) Applicant: Bestop, Inc., Louisville, CO (US)

(72) Inventors: Stephen J. Lewis, Harrison Township, MI (US); Charles C. Turney, Toledo, OH (US)

(73) Assignee: Bestop, Inc., Louisville, CO (US)

( * ) Notice: Subject to any disclaimer, the term of this patent is extended or adjusted under 35 U.S.C. 154(b) by 62 days.

(21) Appl. No.: 16/839,291

(22) Filed: Apr. 3, 2020

(65) Prior Publication Data

US 2020/0317035 A1 Oct. 8, 2020

Related U.S. Application Data

(60) Provisional application No. 62/828,838, filed on Apr. 3, 2019.

(51) Int. Cl.
*B60J 7/12* (2006.01)

(52) U.S. Cl.
CPC ........... *B60J 7/1234* (2013.01); *B60J 7/1265* (2013.01); *B60J 7/1291* (2013.01)

(58) Field of Classification Search
CPC ...... B60J 7/1234; B60J 7/1243; B60J 7/1265; B60J 7/1291; B60J 7/1851
USPC .... 296/219, 216.01, 216.02, 216.03, 216.06, 296/107.13
See application file for complete search history.

(56) References Cited

U.S. PATENT DOCUMENTS

| | | | | |
|---|---|---|---|---|
| 2,184,537 A | * | 12/1939 | Valletta | B60J 7/1291 296/219 |
| 3,082,030 A | * | 3/1963 | Duluk | B60J 7/1851 292/113 |
| 5,299,850 A | * | 4/1994 | Kaneko | B60J 7/1291 296/107.13 |
| 5,775,767 A | * | 7/1998 | Harrison | B60J 7/108 296/107.09 |
| 6,409,248 B1 | * | 6/2002 | Bores | B60J 7/1265 296/107.07 |
| 7,938,483 B2 | * | 5/2011 | Reitzloff | B60J 7/061 296/219 |
| 2015/0352937 A1 | * | 12/2015 | Haberkamp | B60J 7/1851 296/219 |
| 2016/0263975 A1 | * | 9/2016 | Bowles | B60J 7/1291 |
| 2018/0043824 A1 | * | 2/2018 | Troeger | B60Q 3/49 |
| 2019/0084390 A1 | * | 3/2019 | Tischer | B60J 7/10 |
| 2020/0130486 A1 | * | 4/2020 | Gauci | B60J 7/1265 |
| 2020/0254859 A1 | * | 8/2020 | Gauci | B60J 7/1234 |

\* cited by examiner

*Primary Examiner* — Jason S Morrow
*Assistant Examiner* — Wenwei Zhuo
(74) *Attorney, Agent, or Firm* — Warn Partners, P.C.

(57) ABSTRACT

An articulating soft front cockpit cover assembly having no 2-bow drive link for a vehicle. The soft front cockpit cover assembly in sealing engagement with a rearward top portion of a roof. The articulating portion movable between at least a closed position over about the front vehicle cockpit and at least one open position for an open air feel.

17 Claims, 31 Drawing Sheets

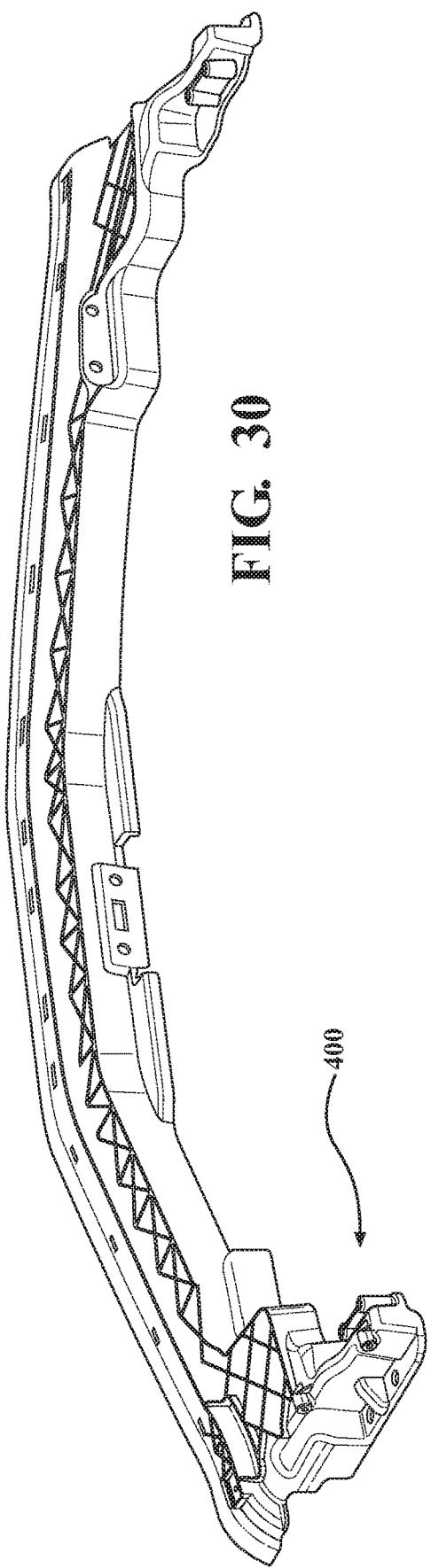
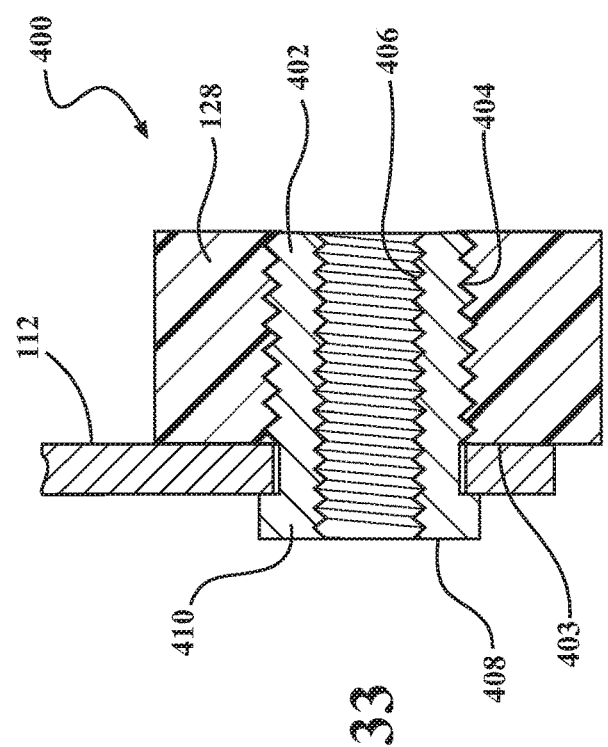
FIG. 30
FIG. 33

SOFT FRONT COCKPIT COVER WITH UNCONNECTED 2 BOW SYSTEM

CROSS-REFERENCE TO RELATED APPLICATIONS

This application claims the benefit of U.S. Provisional Application No. 62/828,838, filed Apr. 3, 2019. The disclosures of the above application are incorporated herein by reference.

FIELD OF THE INVENTION

The present invention relates to a roof top assembly including at least one soft panel top cover that seals against a rear top portion of the roof of a vehicle.

BACKGROUND OF THE INVENTION

Providing convertible tops for sport utility (SUV) type vehicles is desired. Foldable stowable roof soft tops are commonly used in sport-utility vehicles for recreational purposes. The foldable roof is typically moved between a stowed position, and a deployed position. When in the deployed position, the foldable roof protects the occupants of the vehicle from various weather conditions. The foldable roof also includes various sections which are made of a clear material to essentially function as a window, allowing the occupant of the vehicle to see outside of the vehicle. However, there are occasions where the weather is pleasant, and it is desired by the occupants of the vehicle to move the foldable roof to an open position such that the vehicle essentially functions without part of a roof or essentially functions without a roof, and the passenger compartment of the vehicle is exposed to the atmosphere. This allows the occupants of the vehicle to enjoy more favorable weather conditions while driving.

An alternative to the convertible soft top is to use a hard top that is bulky and does not provide any open air feel without removing the entire top. If the entire hard top is removed, it then must be stored, which is often difficult because of the size of the top. Other convertible roofs use a hard top that is large and bulky and does not provide any open air feel without removing two front top panels, which is also laborious, difficult, time consuming, and ergonomically disadvantageous. If one or more of the front top panels are removed, they then must also be stored, which is often difficult because of the size weight of the panels. While this will give the occupant an open air feel, the panels are large and bulky. If the occupant wants to gain the open air feel they need to exit the vehicle and remove the panels using multiple knobs and latches and then store the panels. This makes for a time consuming operation as well as a potential storage issue due to the size of the panels. They are also hard to handle due to their size and weight and due to the fact they must be installed and removed over the operators head. In the event of inclement weather, the panels also cannot be quickly put back in place.

Accordingly, there exists a need for a more manageable and easily stowable top made of articulable material or arrangement to provide an efficient light weight top that can be effectively opened quickly to provide what is often referred to as an open air feel, where a portion of the top of the roof is moved from a closed or deployed position to at least one open or stowed position exposing a portion of the inside vehicle cockpit/passenger compartment to the outside without removing the top.

SUMMARY OF THE INVENTION

The present invention is directed to a foldable roof assembly having a soft front cockpit cover assembly that is in operable sealing engagement with a hard top portion of the roof. The soft panel top assembly has a pivotal portion that is lightweight and folds back without the operator needing to leave the vehicle to give the occupant a quick and easy sunroof/open air feeling in the front cockpit. This is done more easily than with typical two-panel hard top systems that are more time consuming to disengage from the vehicle and are bulky to handle and remove. The present invention also eliminates storage issues since the soft panel top folds back rather than having to be removed entirely and stored as with conventional hard top panels.

The soft front cockpit cover assembly includes two door rails operably connected to side sport bars of the vehicle (or other vehicle component(s)) and a rear header operably connected to the vehicle. The soft front cockpit cover assembly includes an articulating portion including a front side rail operably connected to first bow and a 2-bow pivot link operably connected to a 2-bow. The articulating portion cycles between a closed position and at least one open position, preferably an open sunroof position. The articulating movement is realized without the need for a 2-bow link. Most preferably, the rear header is a closeout for operable sealing engagement with a hard top roof portion. The rear header is most preferably lightweight by using a lighter rear header, e.g., rear header closeout that is a wireframe and/or lightweight molded piece and/or lightweight molded section(s), and by using minimal framing and using soft goods. The foregoing all further helps with ease of installation and ease of cycle efforts of the pivotal portion. Further, preferably, the assembly is mountable to the vehicle without any modification, drilling of holes, or any other change to existing hardware and structure to the vehicle other than the removal of the manufacturer existing front cockpit panel, e.g., hard panel(s).

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 30 is a perspective view of a rear header, according to an aspect of the present invention;

FIG. 33 is a sectional view depicting threaded inserts and connector arrangement, according to an aspect of the present invention.

DETAILED DESCRIPTION OF THE PREFERRED EMBODIMENTS

The following description of the preferred embodiment(s) is merely exemplary in nature and is in no way intended to limit the invention, its application, or uses.

Figure 1:
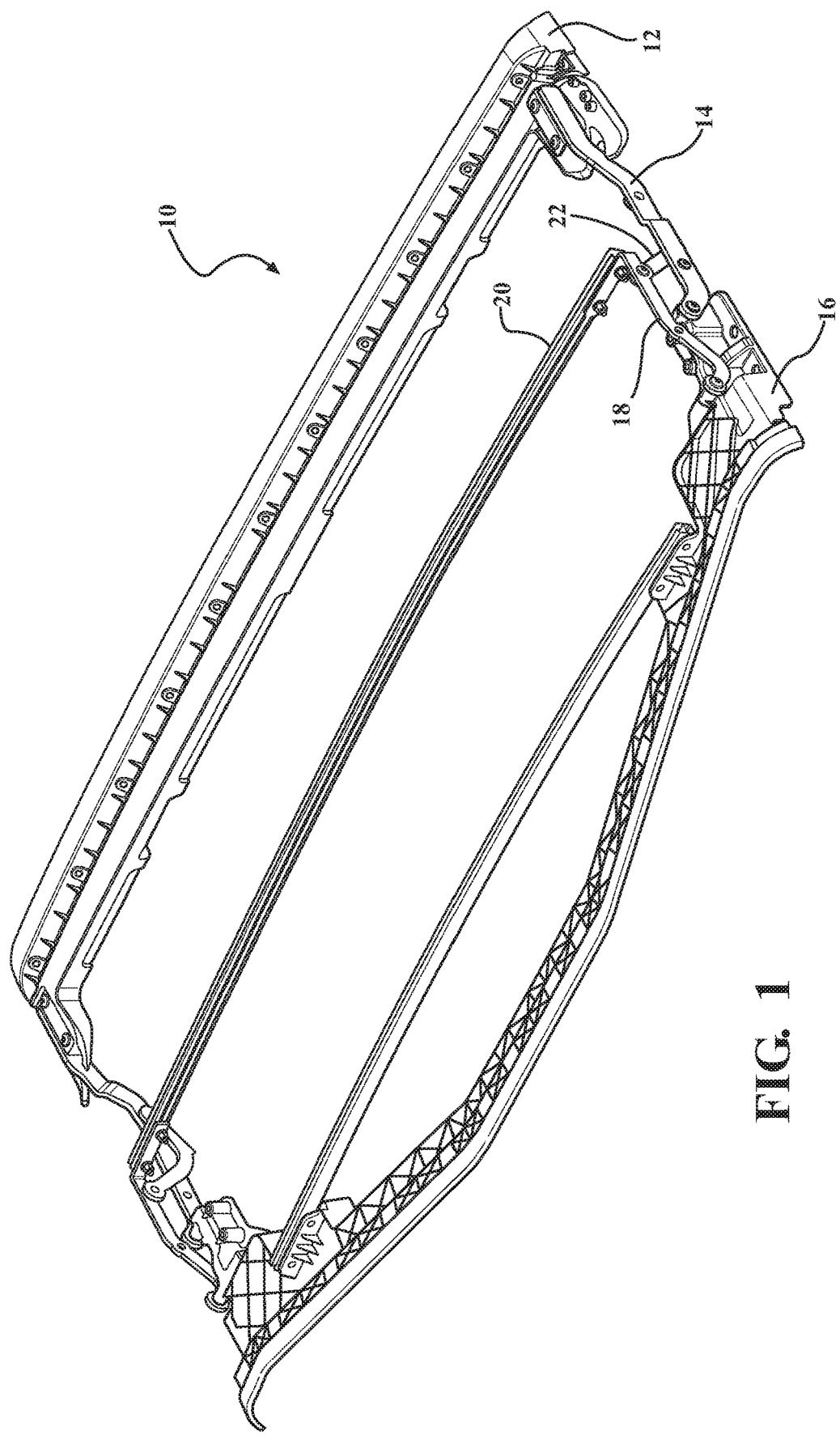
FIG. 1 is a perspective view of a soft panel top cover assembly with a 2-bow drive link.
Figure 2:
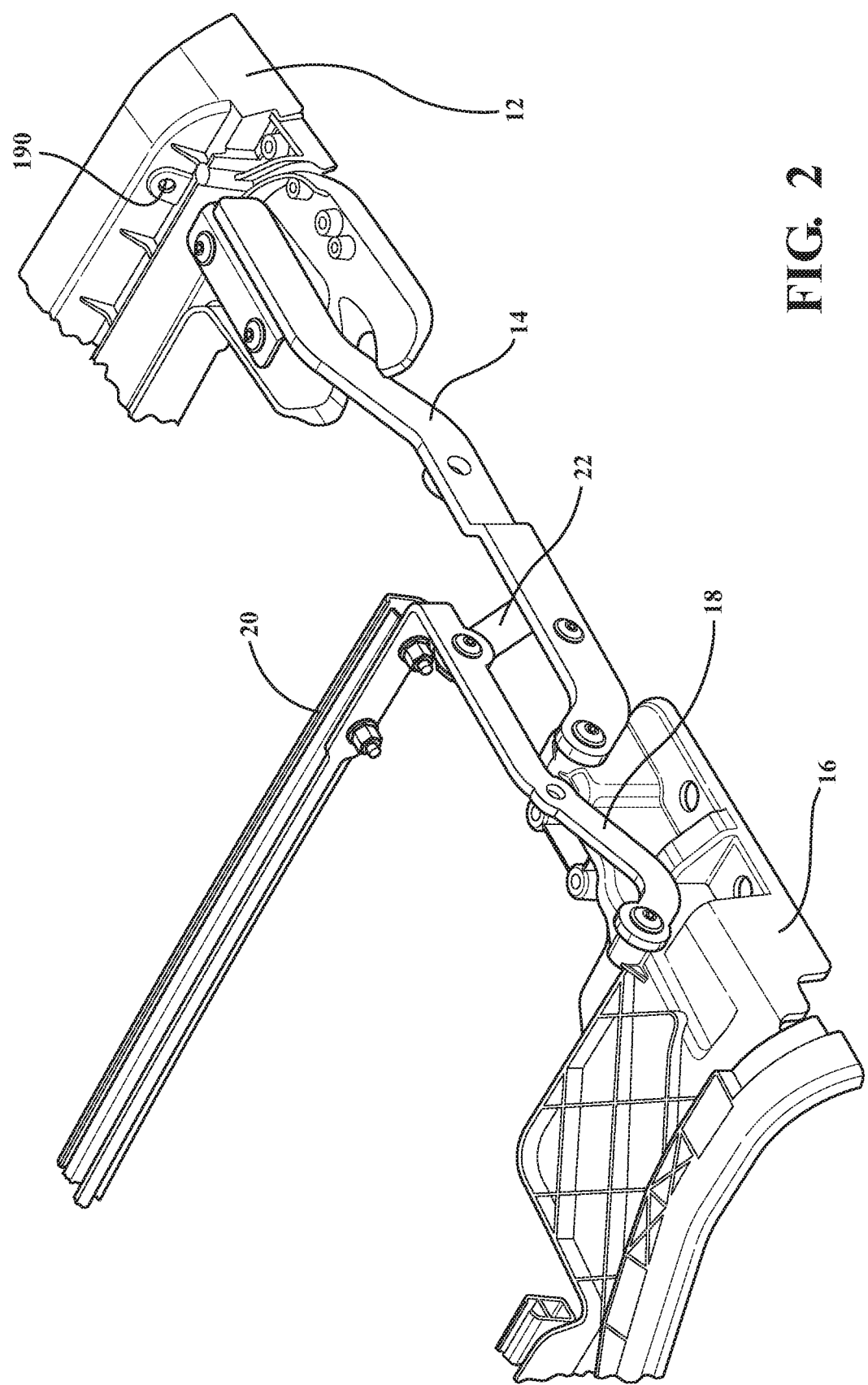
FIG. 2 is an enlarged view taken from CA' of FIG. 1.

Referring to FIGS. 1-2, there is depicted a soft top cover assembly shown generally at 10 including a front header 12 connected to a front side rail 14 and a rear header 16 connected to a 2-bow pivot link 18. The 2-bow pivot link 18 is connected to a 2-bow 20 connected to a cover 19 that is a roof top soft cover. FIGS. 1-2 depict a closed sunroof position. A 2-bow drive link 22 is connected to the 2-bow pivot link 18 and front side rail 14, such that when the front header 12/front side rail 14 rotate rearward toward an open sunroof position, the 2-bow drive link 22 drives rearward rotation of the 2-bow pivot link 18. The 2-bow pivot link 18 draws the 2-bow pivot link 18 generally in a forward rotation to the closed position, when desired.

Referring generally now to FIGS. 3-25 and 30-33, and more particularly to FIGS. 3-18, there is provided a soft front cockpit cover assembly, shown generally at 110, with a 2-bow pivot link 112 that is not directly connected to a 2-bow drive link (e.g., by a link). There is no 2-bow drive link in accordance with the present invention.

Figure 3:
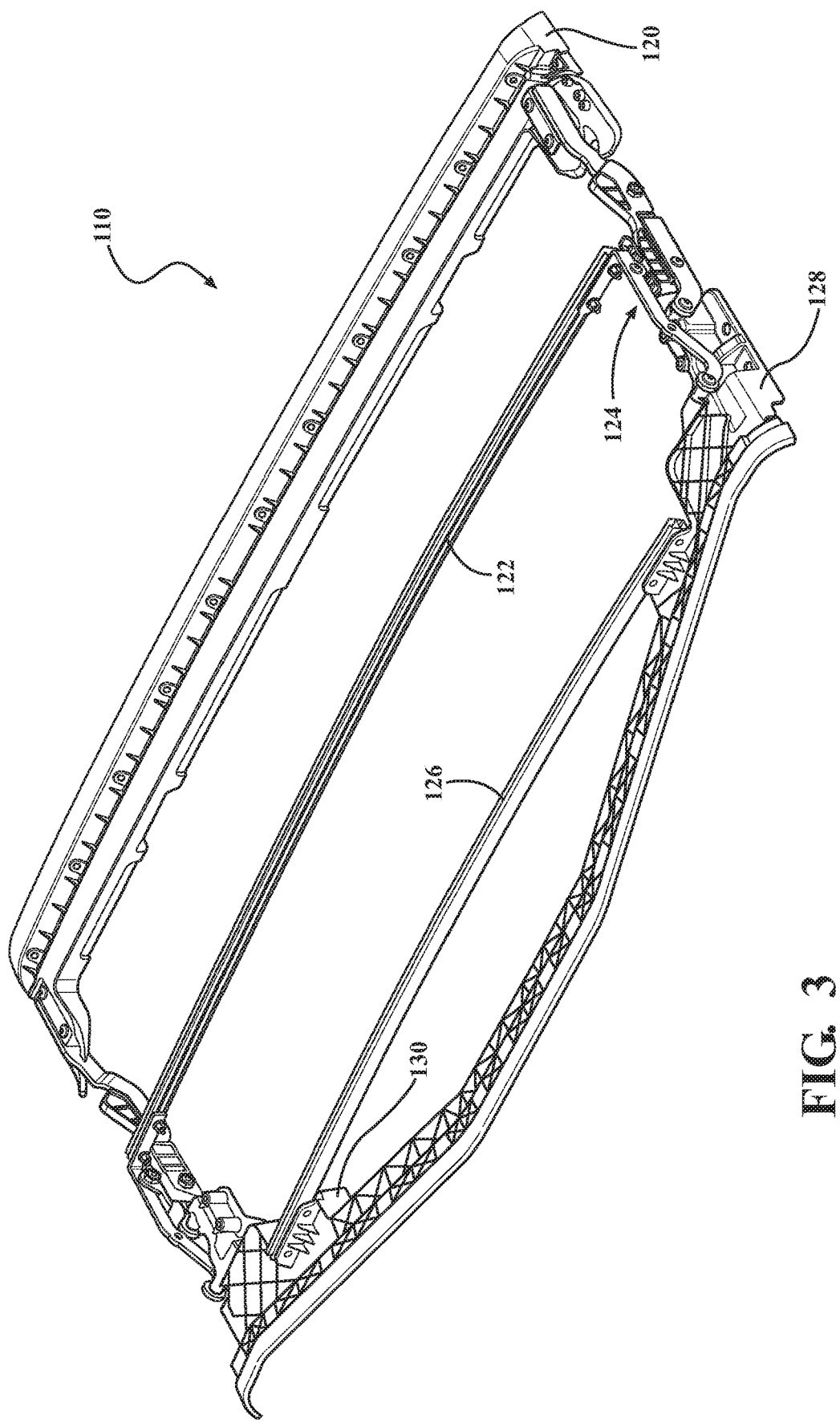
FIG. 3 is a perspective view of a soft front top cover assembly in accordance with the present invention.
Figure 4:
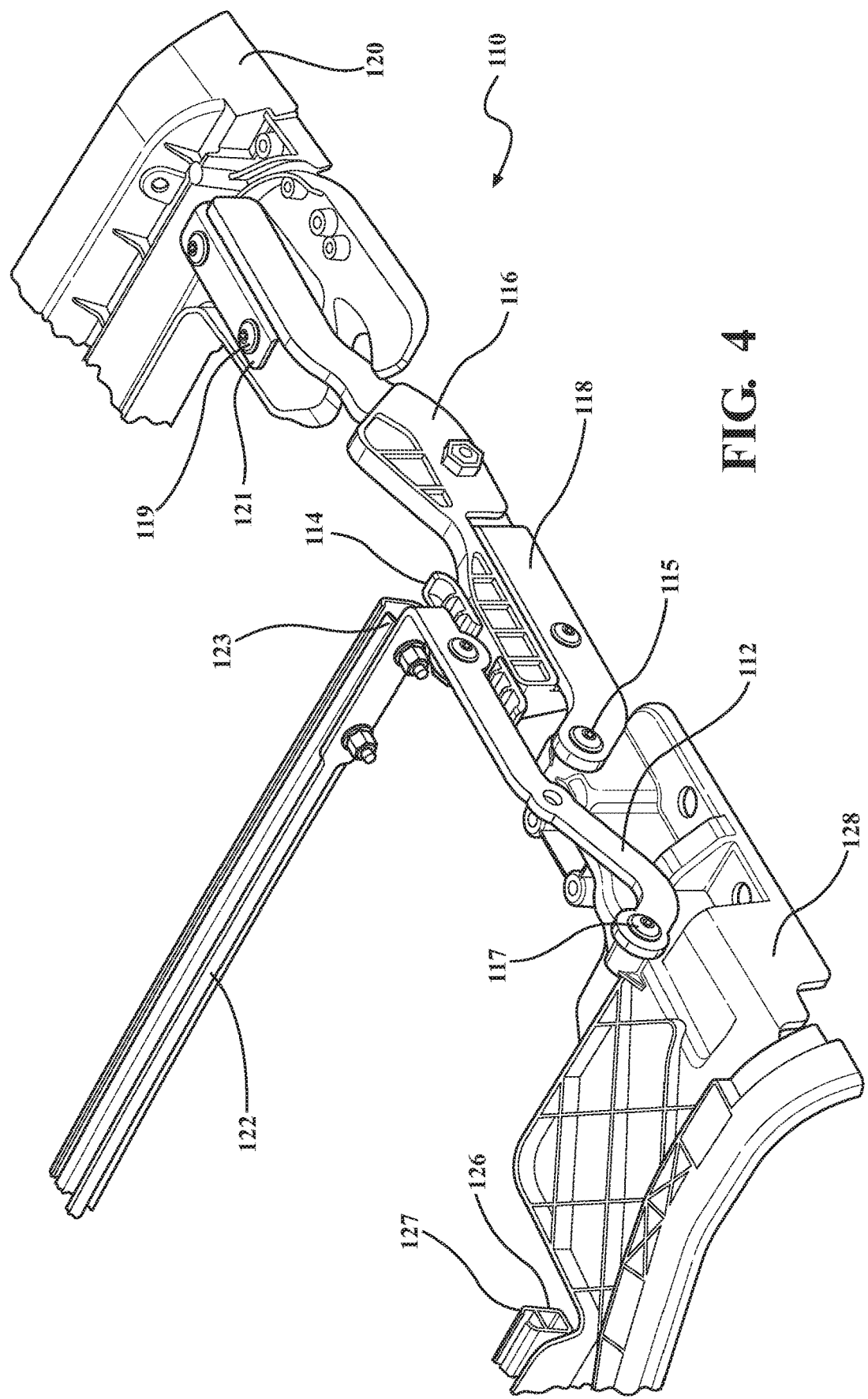
FIG. 4 is an enlarged view taken from FIG. 3.
Figure 5:
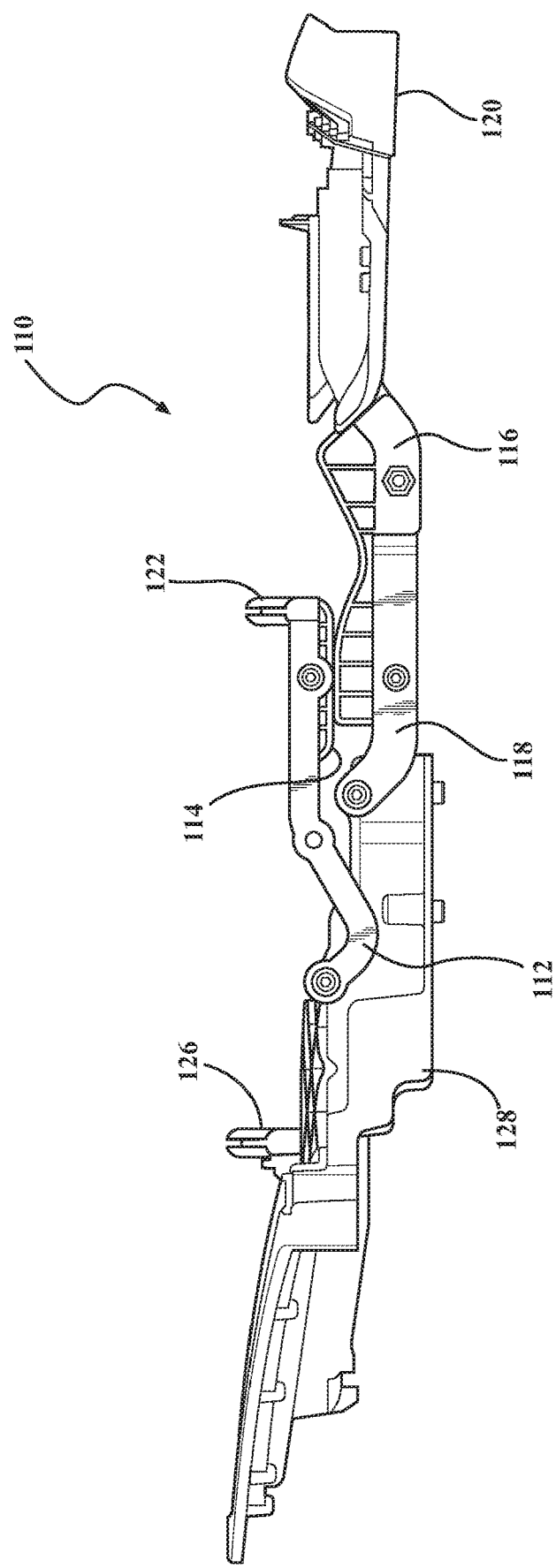
FIG. 5 is a side elevation view of FIG. 3.

FIGS. 3-5 depict the assembly 110 in a closed position or closed roof top position covering or closing off the front roof top opening, for a sport utility vehicle. A 2-bow stop 114 is operably attached to the 2-bow pivot link 112 and operably rests on top of a 2-bow guide block 116, thereby controlling the 2-bow height to a predetermined height. The 2-bow guide block 116 is operably connected to a front side rail 118. The front side rail 118 is operably connected to a front header 120, e.g., by at least one fastener through at least one aperture 119 formed in the front side rail 118 or a bracket 121 of the front side rail 118 (e.g., see FIG. 4). The front side rail 118 is connected at at least one first pivot point 115, preferably a single pivot point 115 to the rear header 128. The 2-bow pivot link 112 is connected at at least one second pivot point 117, preferably a single pivot point 115 to the rear header 128. It is understood that alternative pivot 115,117 locations suitable for pivoting the articulating portion depending on the application is contemplated without departure from the scope of the present invention (e.g., either or both pivots alternatively provided on the door rail 140).

It is understood that the 2-bow stop 114 is adaptable to rest upon another suitable predetermined part of the assembly 110 without departure from the scope of the present invention. It is understood that any other stop suitably configured to set the height and contact the 2-bow guide block 116 for rotation to the open position is contemplated without departure of the scope of the present invention.

The 2-bow pivot link 112 is operably connected to a 2-bow 122, which 2-bow 122 is a cross vehicle bow. Preferably, the 2-bow 122 is a fabric management bow. Most preferably, the 2-bow 122 is a fabric management bow operably coupled to the soft top cover 19 and operably configured and arranged to provide operable fabric management of the cover 19 between the closed position and the at least one open position (e.g., sunroof position). It is understood that more than one fabric management bow 122 on articulating portion 124 (or any other predetermined location(s) of the assembly 110) can be provided depending on the application without departure from the scope of the present invention. Preferably, at least one channel 123 (e.g., see FIG. 4) is provided to operably attach the cover 19 to the 2-bow 122 (or any other predetermined location(s) of the assembly 110). The at least one 2-bow 122 is preferably fastened to the 2-bow pivot link 112, e.g. at least one screw, bolt, bracket etc.

Any other attachment locations for at least one 2-bow block 116 and at least one 2-bow stop 114 suitable for cycling the assembly 110 without a 2-bow drive link (e.g., metal link connected to the front side rail 118 and 2-bow pivot link 112) is contemplated depending on the application without departure from the scope of the present invention.

At least one additional bow 126 is operably connected to the rear header 128. Preferably, the least one additional bow 126 is a fabric management bow 126. Most preferably, the at least one additional bow 126 is a fabric management bow operably coupled to the soft top cover 19 and operably connected to a rear header 128, most preferably, fixedly connected to the rear header 128 such that the bow 126 has a fixed location. It is understood that more than one fabric management bow 126 on the rear header 128 (or any other predetermined location(s) of the assembly 110) can be provided depending on the application without departure from the scope of the present invention. Preferably, at least one channel 127 (e.g., see FIG. 4) is provided to operably attach the cover 19 to the rear header 128 (or any other predetermined location(s) of the assembly 110). The at least one additional bow 126 is preferably fastened to the rear header, e.g. at least one screw, bolt, bracket etc).

The fabric management bows 122,126 manage the top cover 19 as the assembly 110 folds to the open position. The fabric management bows 122, 126 also minimize fabric movement in the closed position, which alleviates wind flap noise, in addition to managing the cover 19 during articulation and in the open position.

The rear header 128 operably seals with the rear top cover, e.g., hard top cover. The rear header 128 is preferably a lightweight injection molded material that is at least one piece, more preferably, a plurality of operably connected pieces, most preferably, at least three molded pieces operably connected together, e.g., fasteners, and/or bonded, and/or adhesive, and/or snap fit, and/or snap hook fit, and/or brackets, and/or mechanical fit, and/or mechanical fasteners and any combinations thereof. The rear header 128 preferably has at least two feet 130 that rest on top of a cross vehicle member structure and helps set the height of the rear header 128 relative thereto. The rear header 128 includes at least one mounting surface 132 that operably connects to the vehicle, e.g., fasteners, mushroom fasteners/knobs, etc, connecting each mounting portion 132 to a respective sport bar (vehicle roll bar). Alternatively, both sides of the rear header 128 only connects to respective door rails 140, which door rails 140 are connected to the vehicle (e.g., sport bars).

FIGS. 6-10 depict the assembly 110 rotating back from a closed position to an open position.

Figure 6:
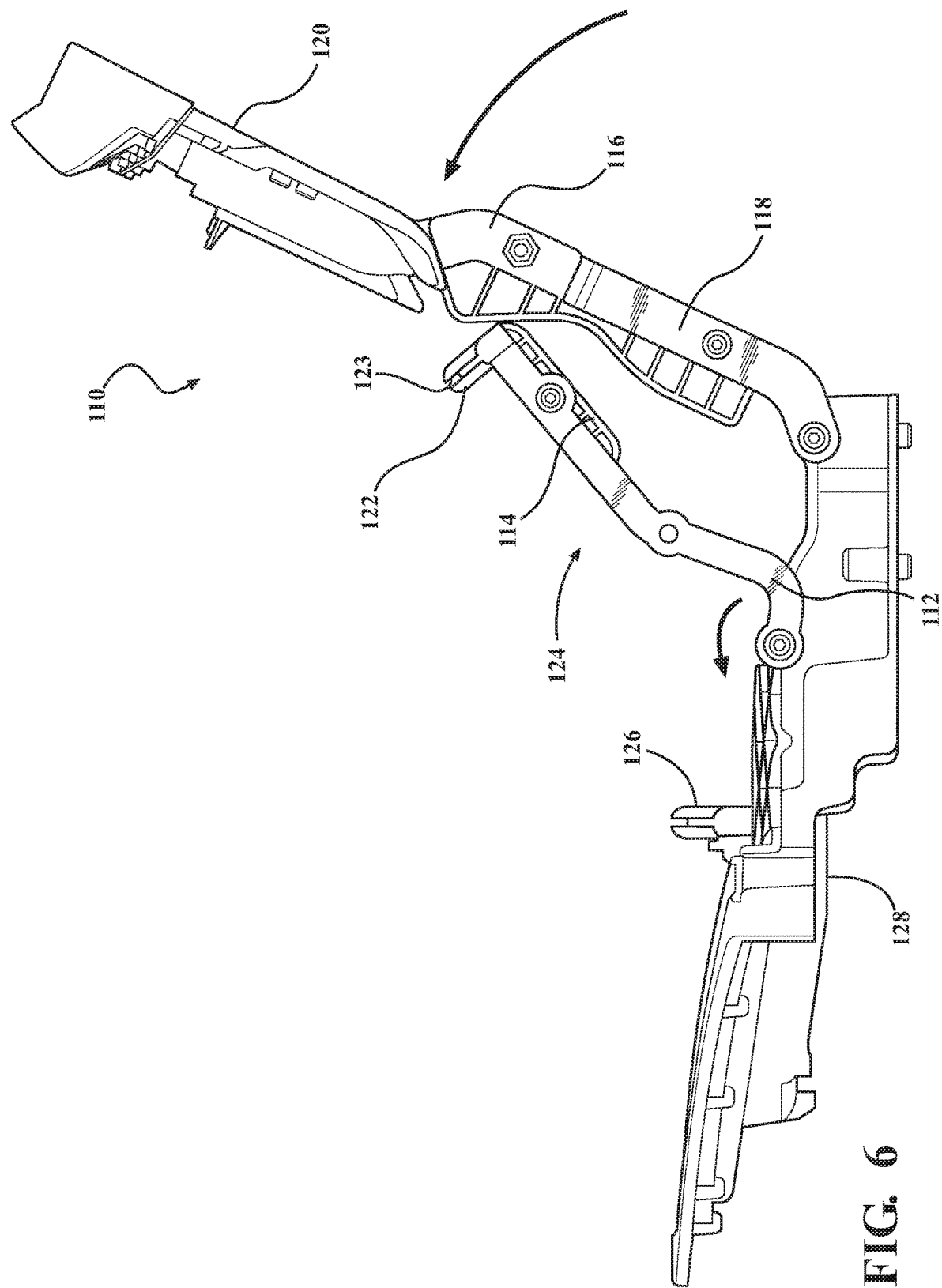
FIGS. 6-10 depict the soft front top cover assembly of FIG. 3 in accordance with the present invention rotating between a closed position and open position.

FIG. 6 illustrates the top in a partially open position. As the top mechanism is cycled into the open position, the 2-bow guide block 116 maintains contact, for at least part of the cycle, with the 2-bow stop 114, thereby lifting and rotating the 2-bow pivot link 112 into the open position.

Figure 7:
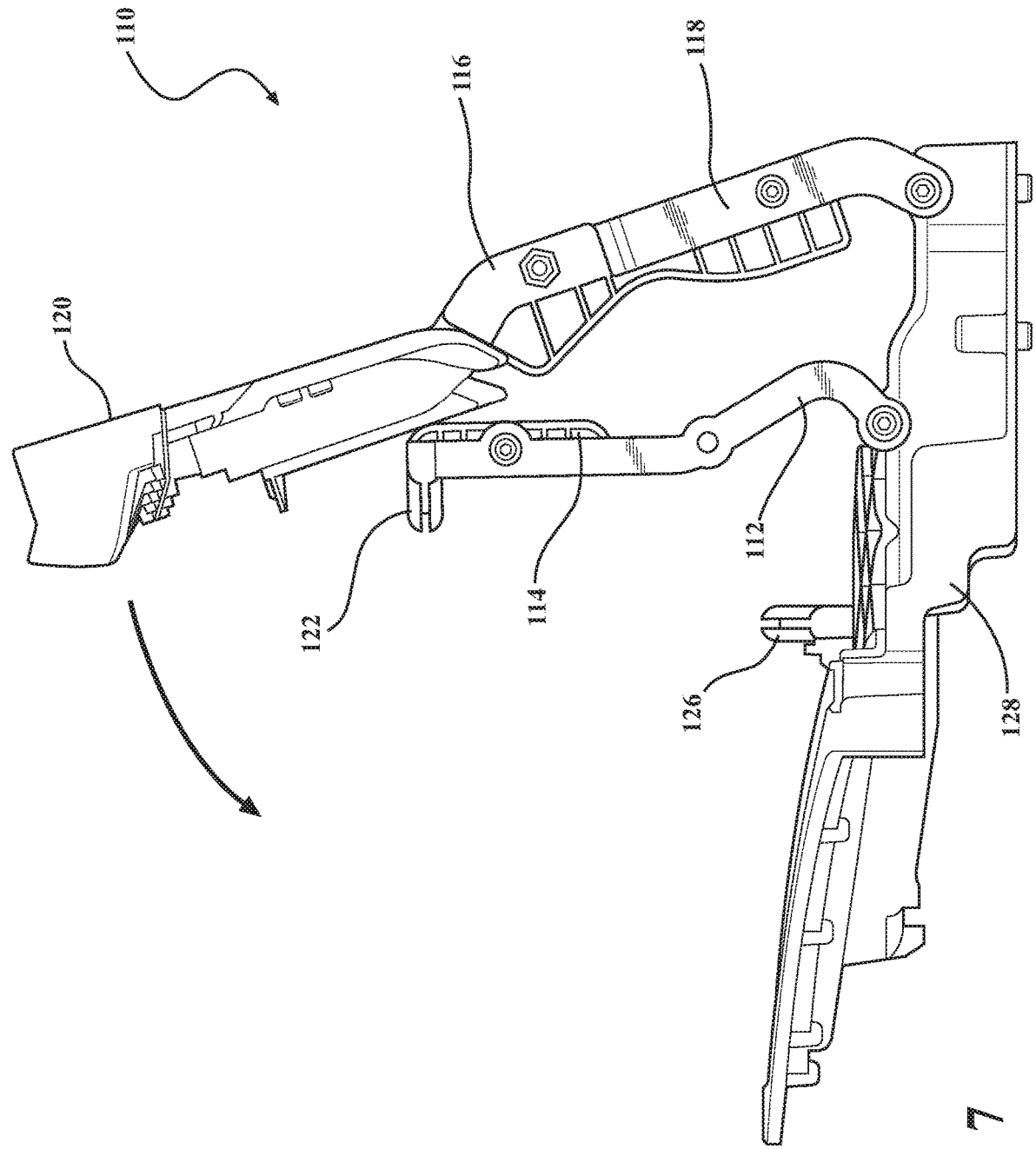
Figure 8:
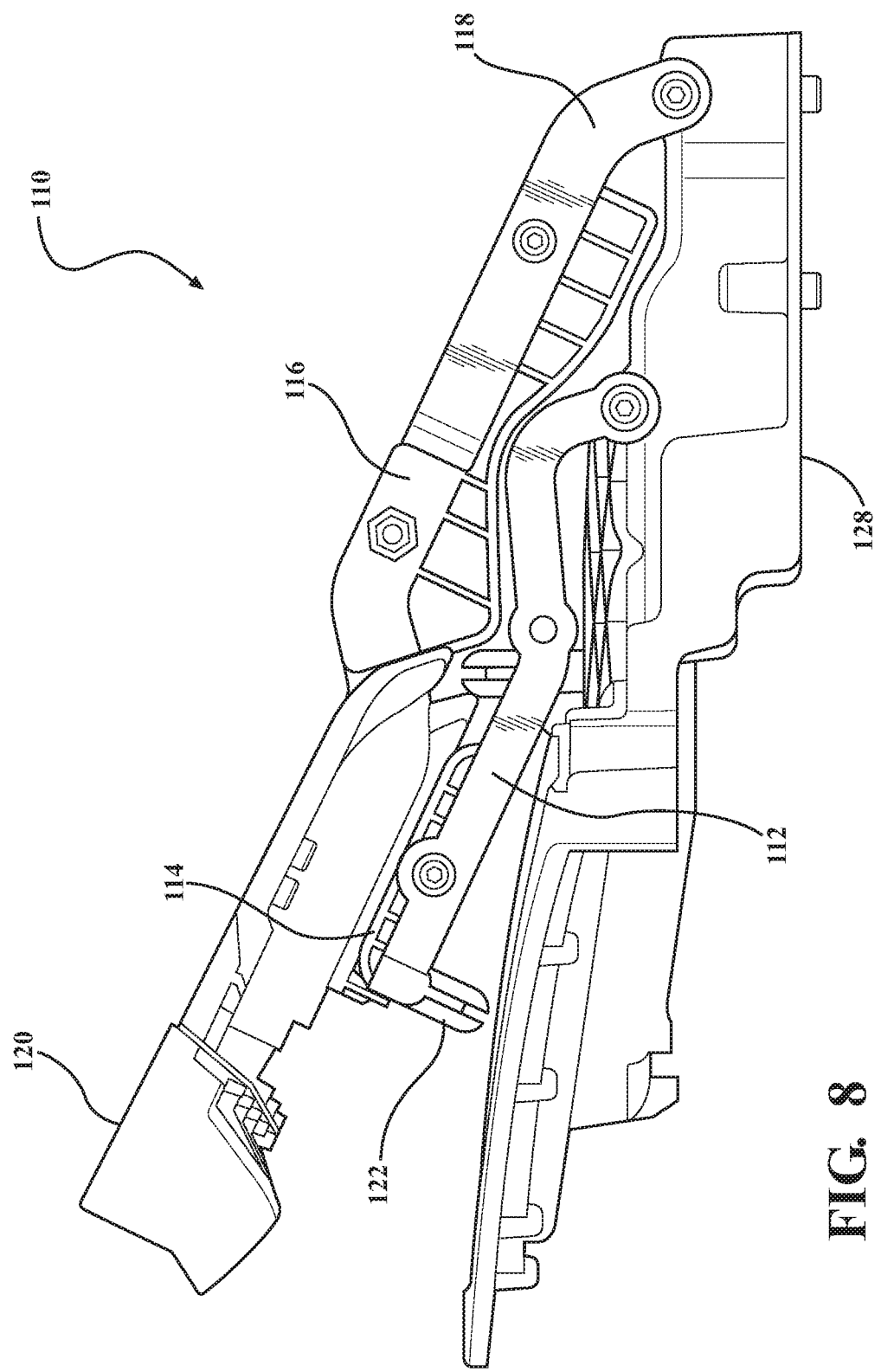
Figure 9:
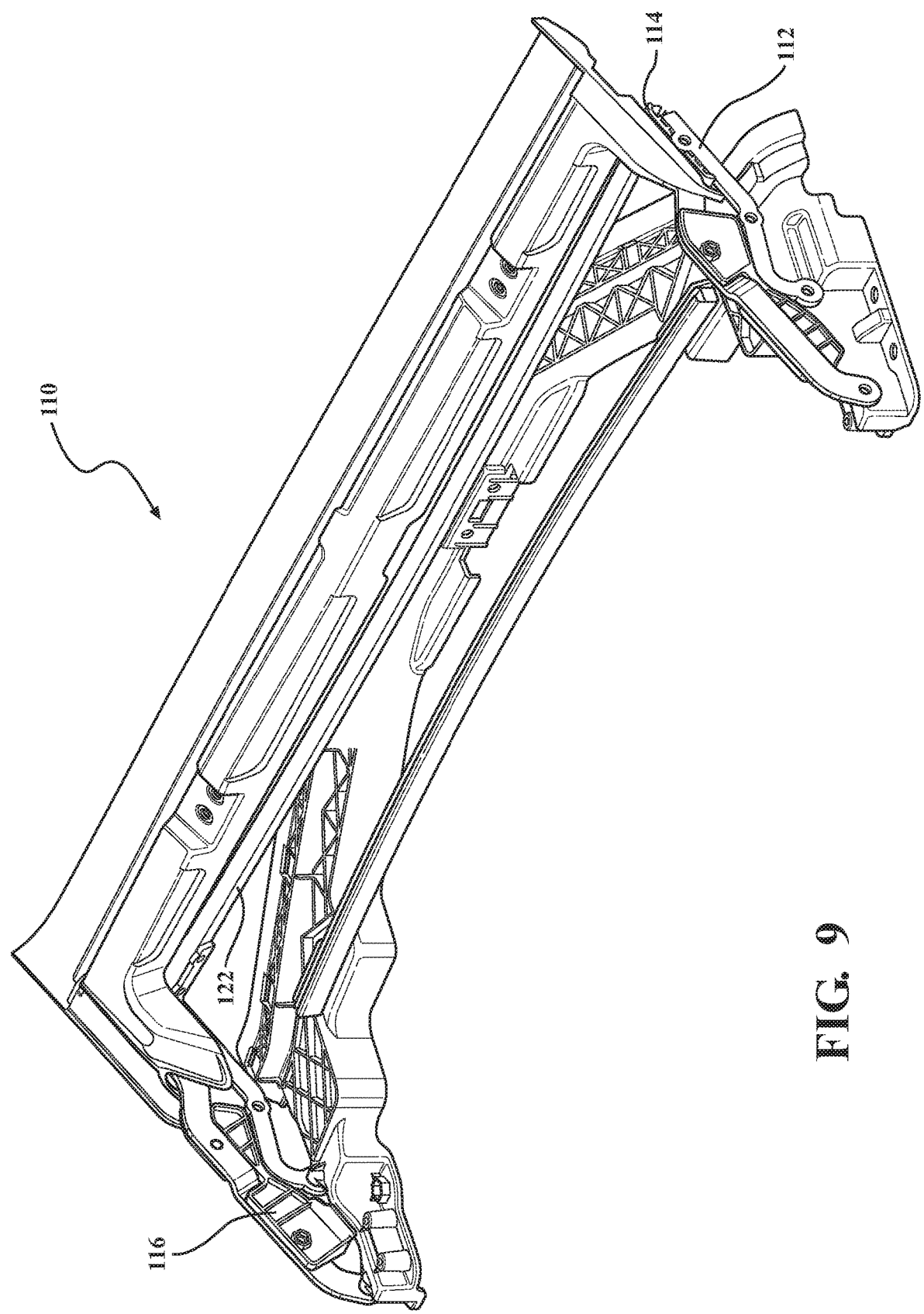
Figure 10:
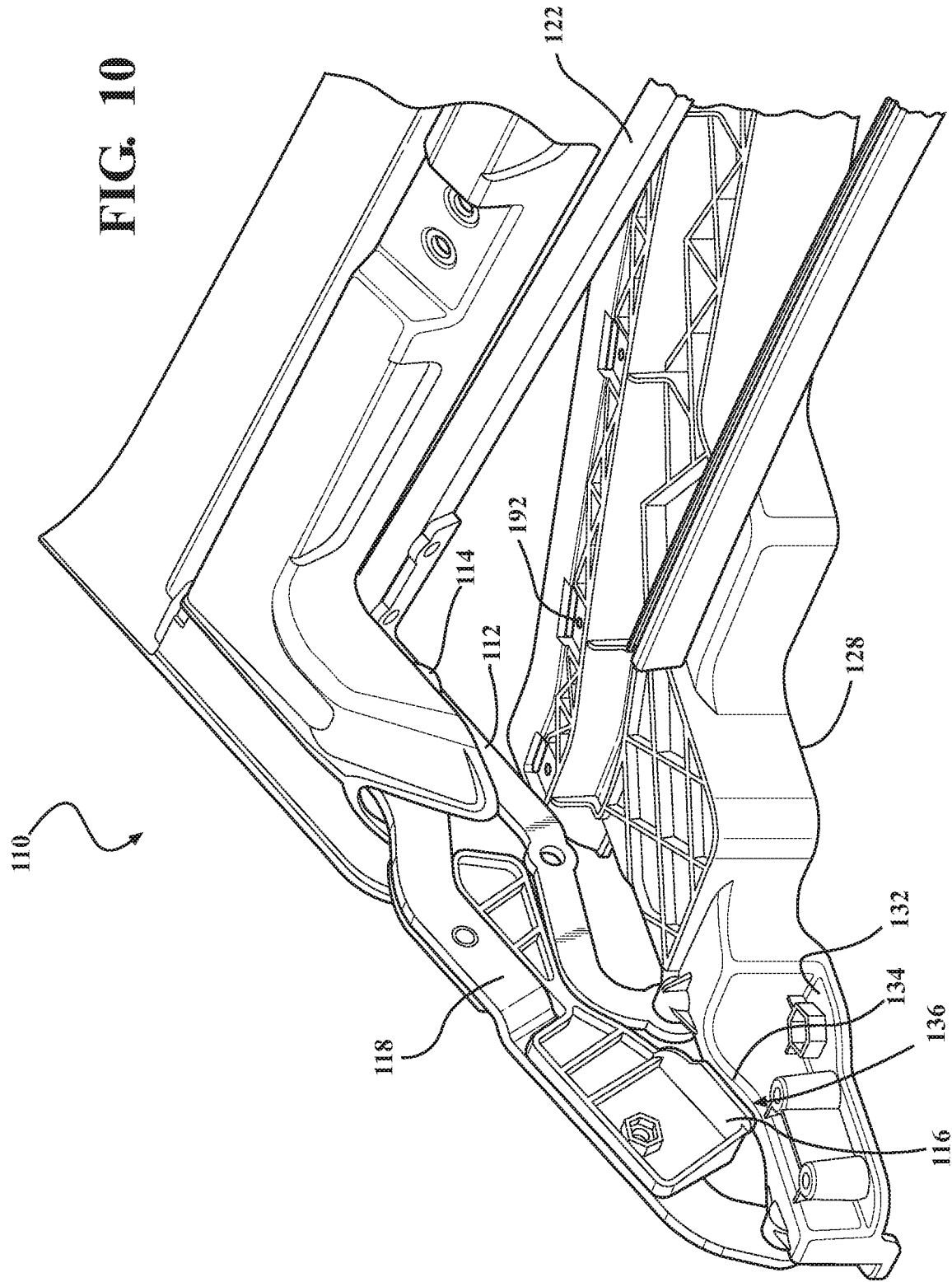

FIG. 7 illustrates the top in a further partially open position. Continuing through the opening motion the 2-bow stop 114 loses contact with the 2-bow guide block 116 and makes contact with the front side rail 118. At this position within the top cycle, gravity then overcomes the mass of the 2-bow assembly 110 and pulls the 2-bow pivot link 112, and thereby the 2-bow 122, into the full open position. FIGS. 8-10 illustrate the top in an exemplary fully open position, thereby providing an open air driving experience. With the top 110 in the full open position, the 2-bow guide block 116 has a hard interface 134 to the rear header 128 (or "rear halo"), thereby creating a stop feature, indicated generally at 136, for the front side rail 118. Alternative interface surface(s) and/or alternative at least one stop feature suitable for allowing/providing front side rail 118 and/or 2-bow pivot link 112 stop feature(s) are contemplated without departure from the scope of the present invention.

Figure 11:
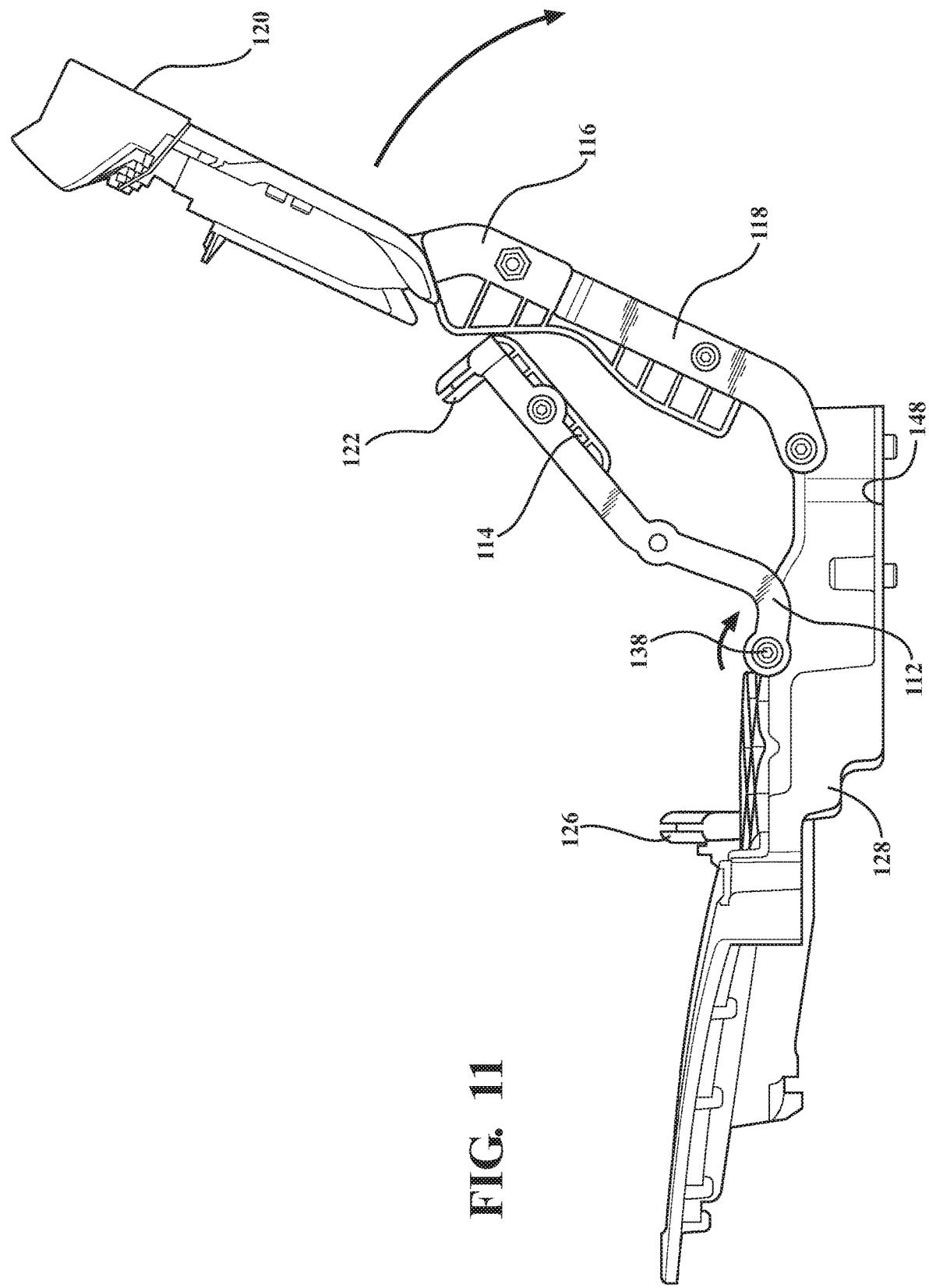
FIG. 11 depicts the soft front top cover assembly of FIG. 3 rotating toward the closed position, according to an aspect of the present invention.

FIG. 11 depict the assembly 110 in a partially closed position rotating forward from the open position to the closed position. Control of the 2-bow assembly is not required to close the top assembly 110 since the top cover fabric is operably attached to the 2-bow 122 and the front header 120. As the assembly 110 is cycled to the closed position, the fabric pulls the bow assembly 110 about the 2-bow pivot link 112 rotation point 138.

Figure 12:
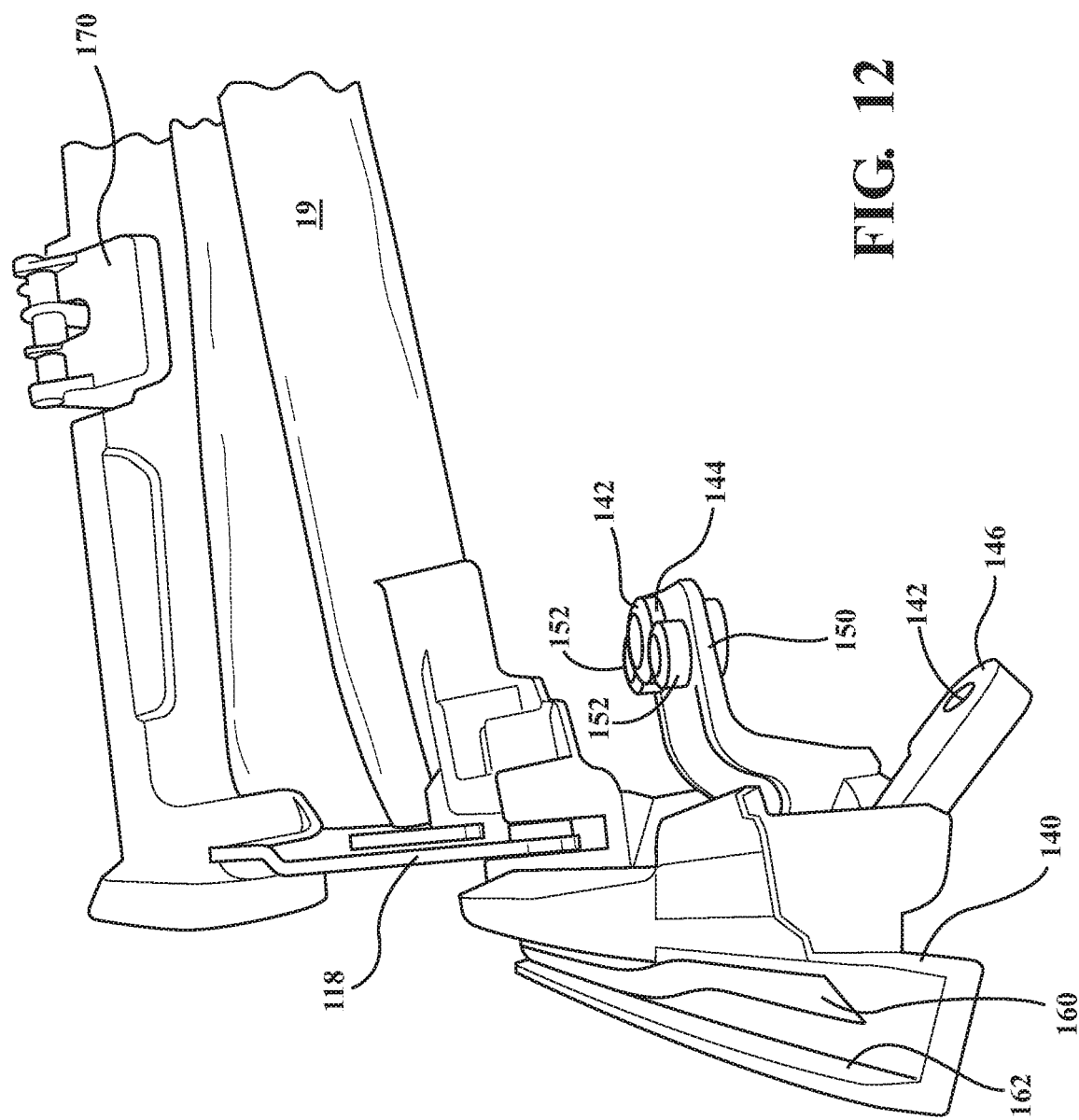
FIG. 12 is a front perspective view of the soft top front cover assembly, in accordance with the present invention.

FIG. 12 depicts a door rail 140 of the assembly 110 for operably connecting to the vehicle, e.g., to the fore/aft sport bar on both sides of the vehicle, providing a mounting location for the rear header 128 and/or operably providing a weather tight door seal or top cover seal, on each side and/or providing a drip rail 162 etc. Preferably, the door rail 140 is attached by at least one mounting surface 144, preferably, a first and second clamping surface 144 and 146 attach to the vehicle (e.g., sport bar) using at least one fastener, e.g., fastener, threaded fastener, bolt, threaded mushroom knob fasteners etc. through at least one aperture 142 through the at least one mounting surface 144 and/or 146. Preferably, at least one mounting surface is provided on a rotatable member that rotates into engagement with the vehicle mounting surface. More preferably, the second clamping surface 146 operable rotates up/down or side-to-side, most preferably, generally up/down to engage the underside of a vehicle part for mounting, e.g., under a sport bar, and preferably, the first mounting surface 144 engages the upper side of the vehicle part for mounting, e.g., on top of the sport bar. As explained previously, the at least one mounting surface 132 on each side of the header 128 are preferably connected to the vehicle (e.g., sport bars).

A second mounting surface 148 is provided on each side of the header 128 to operably connect to the door rail 140. Preferably, at least one aperture 149 is provided on the mounting surface 148 operable for a fastener to mount the rear header 128 on the door rail 140 (e.g., screws, bolts, knobs, threaded fasteners, etc). Most preferably, a plurality of apertures 149 and fasteners.

Figure 13:
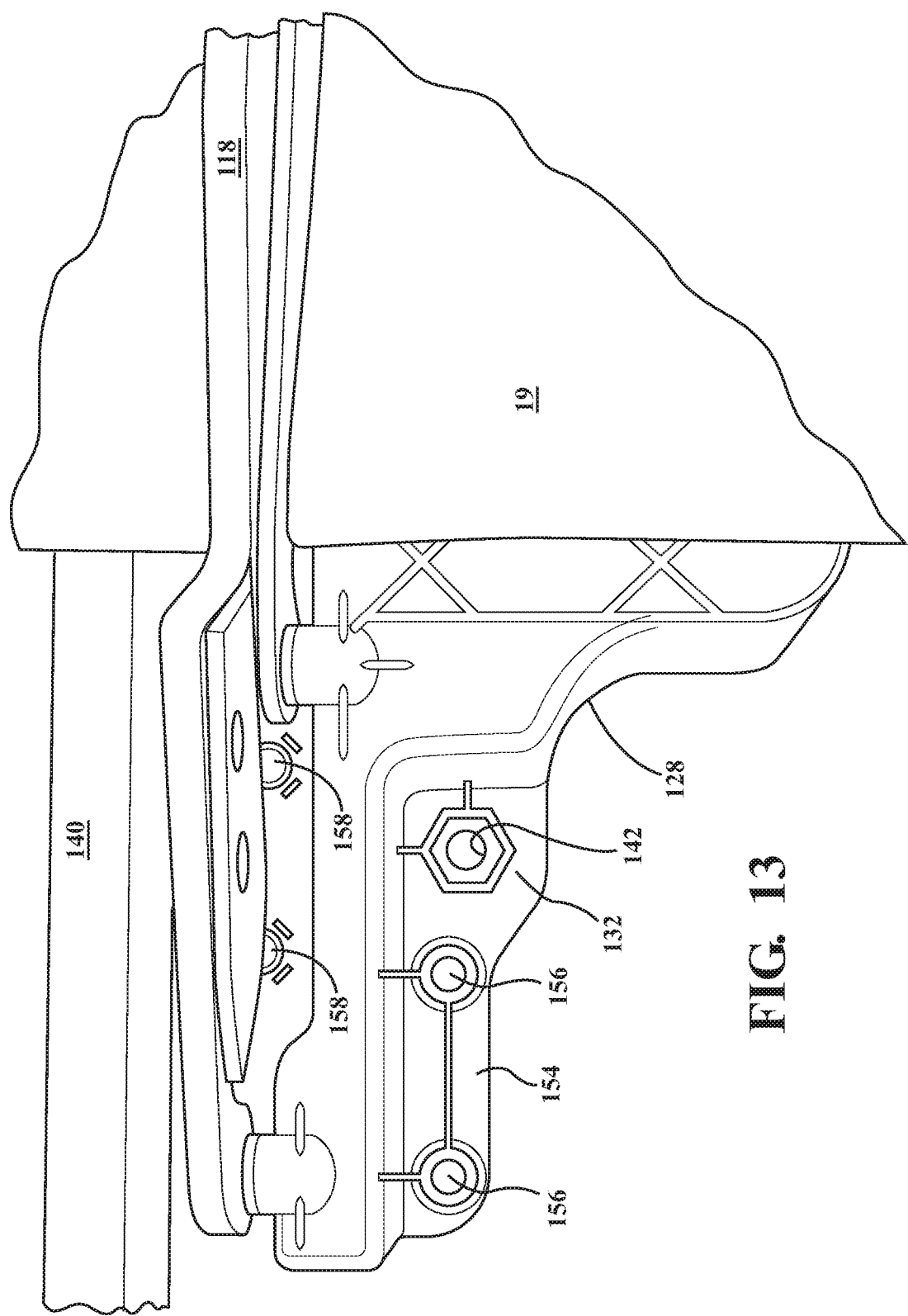
FIG. 13 is a top plan view of the soft top front cover assembly, in accordance with the present invention.
Figure 14:
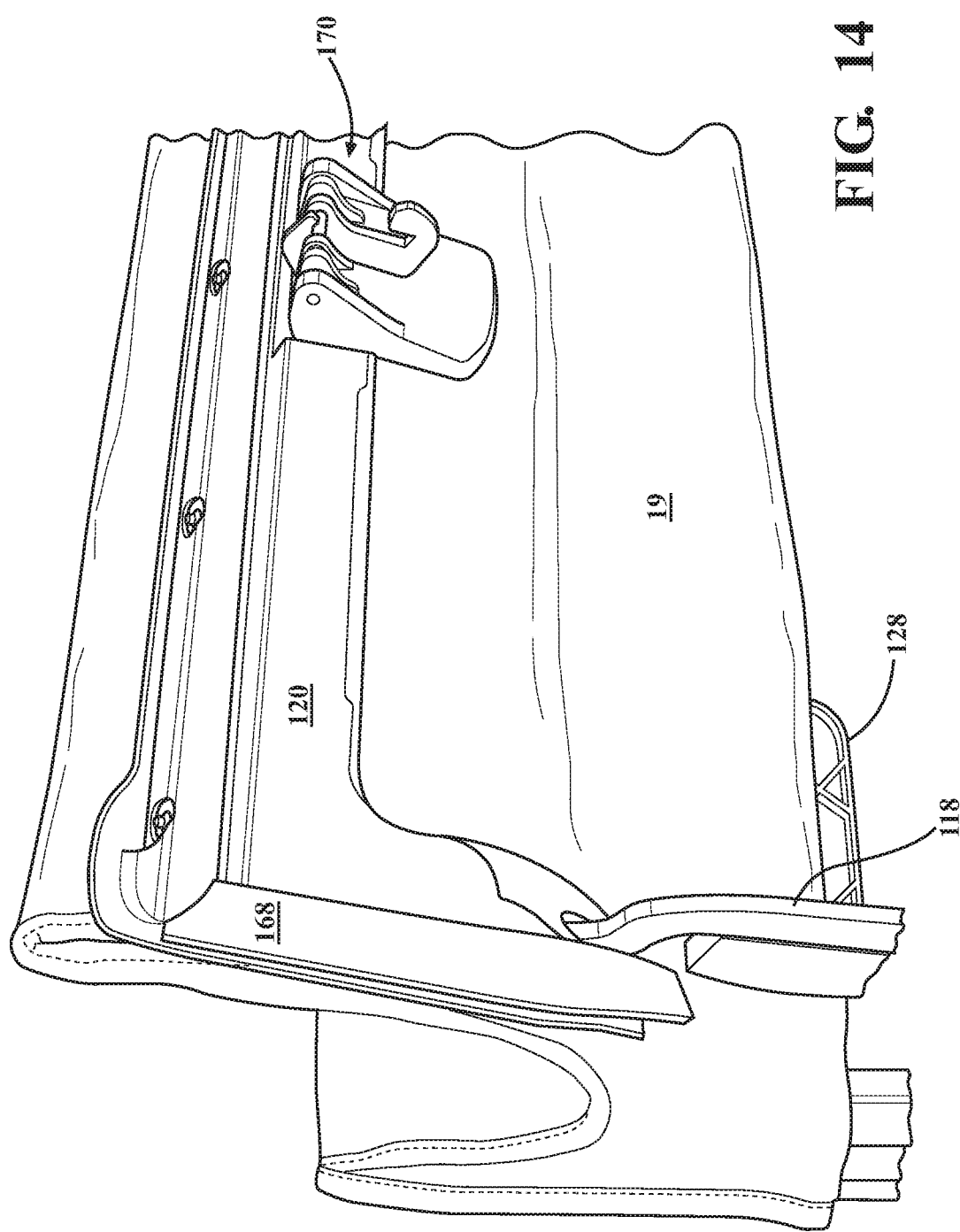
FIG. 14 is a front perspective view including a latch mechanism of the soft top front cover assembly, in accordance with an aspect of the present invention.
Figure 15:
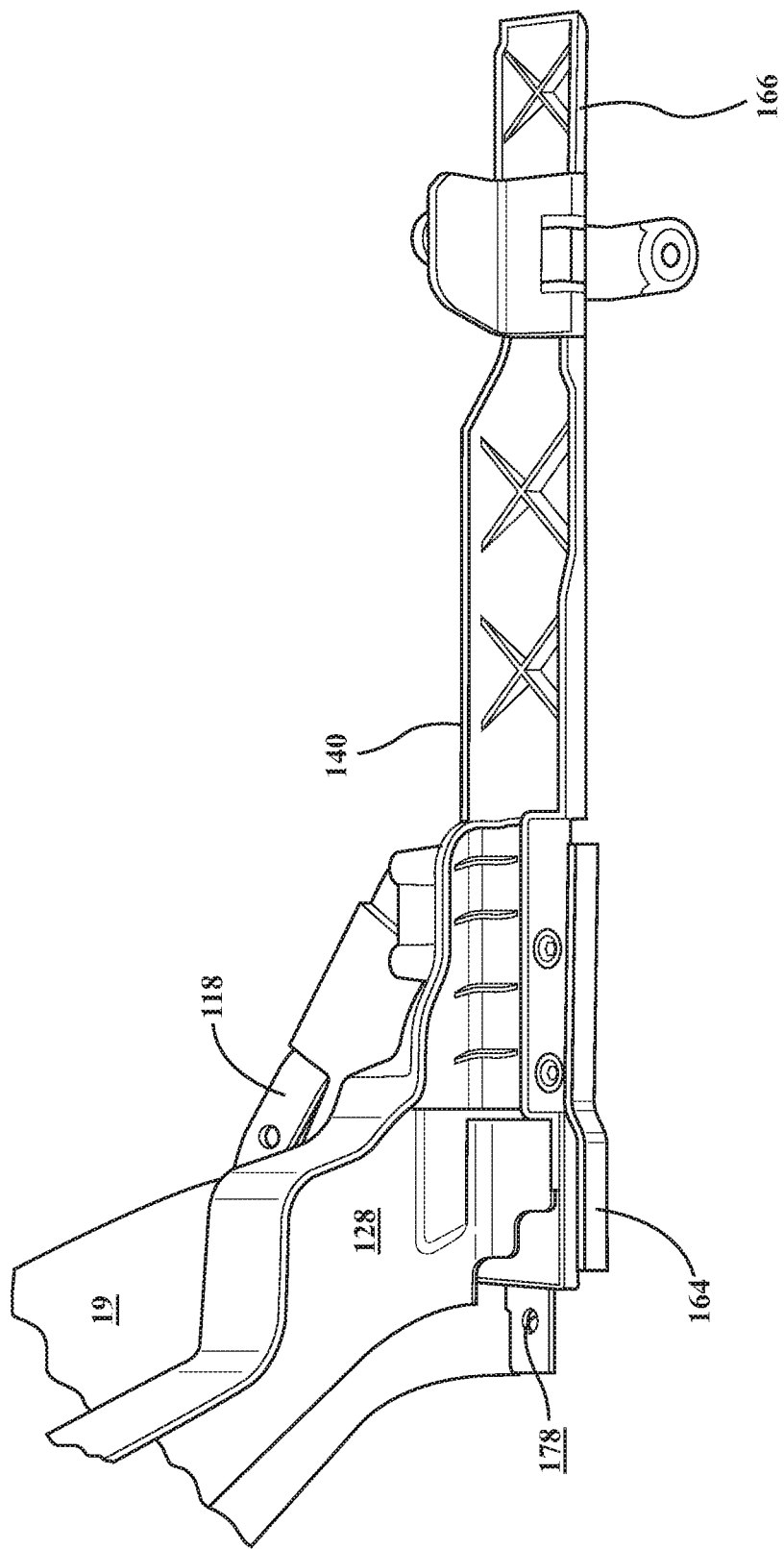
FIG. 15 is a perspective view including a door rail of the soft top front cover assembly, in accordance with an aspect of the present invention.
Figure 16:
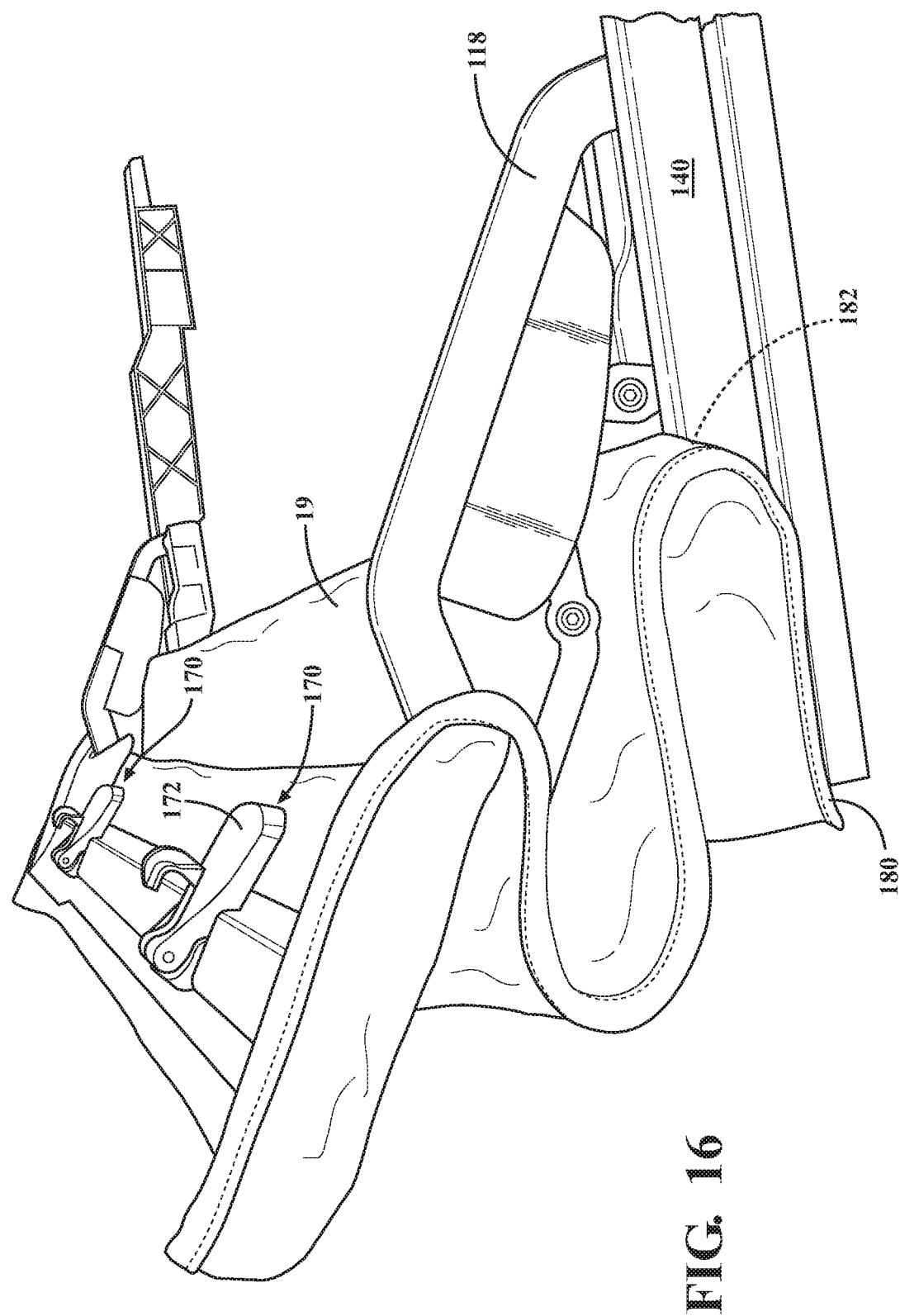
FIG. 16 is a perspective view of the soft top front cover assembly, in accordance with aspects of the present invention.
Figure 17:
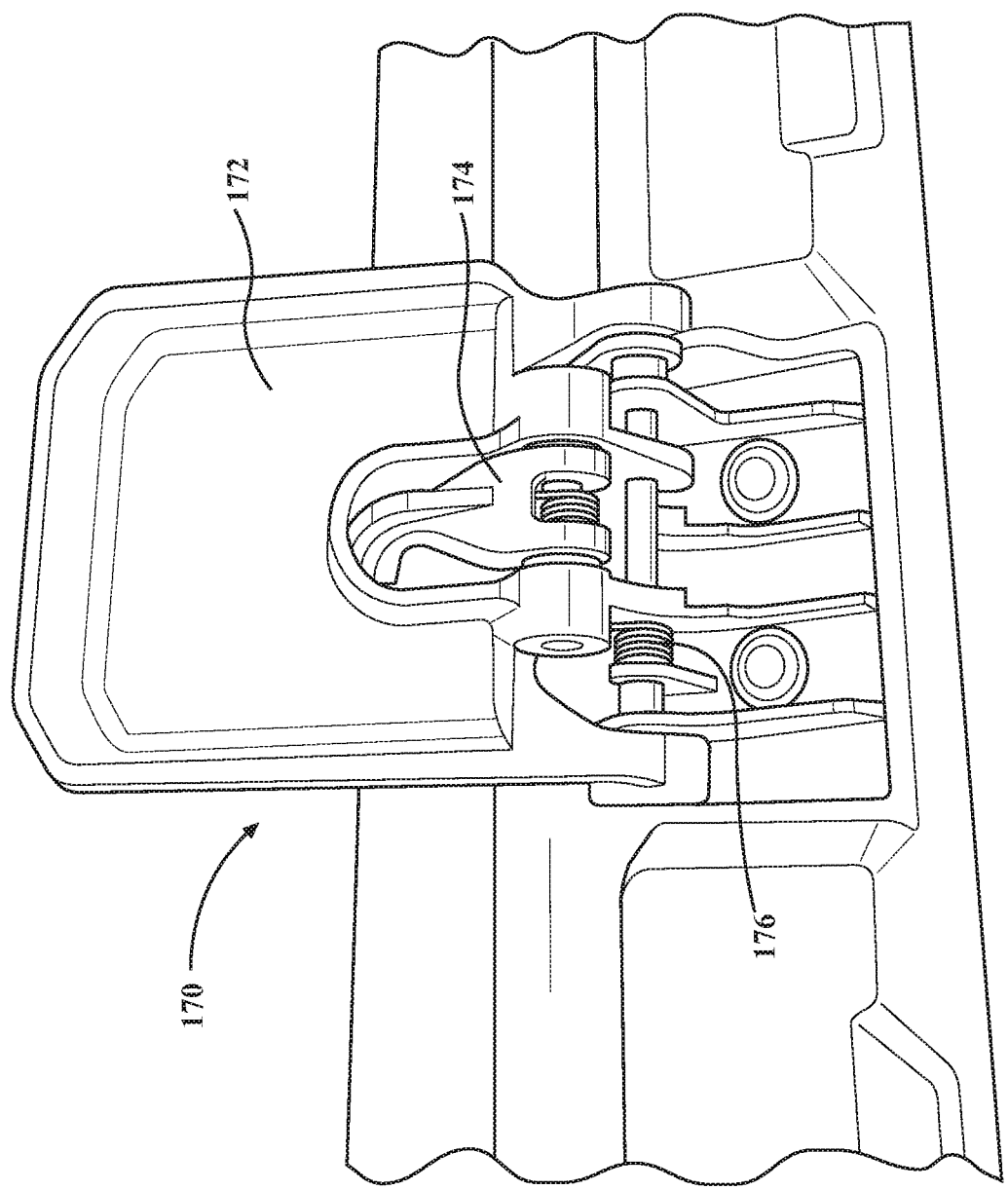
FIG. 17 is a perspective view of the latch mechanism of the soft top front cover assembly, in accordance with an aspect of the present invention.
Figure 18:
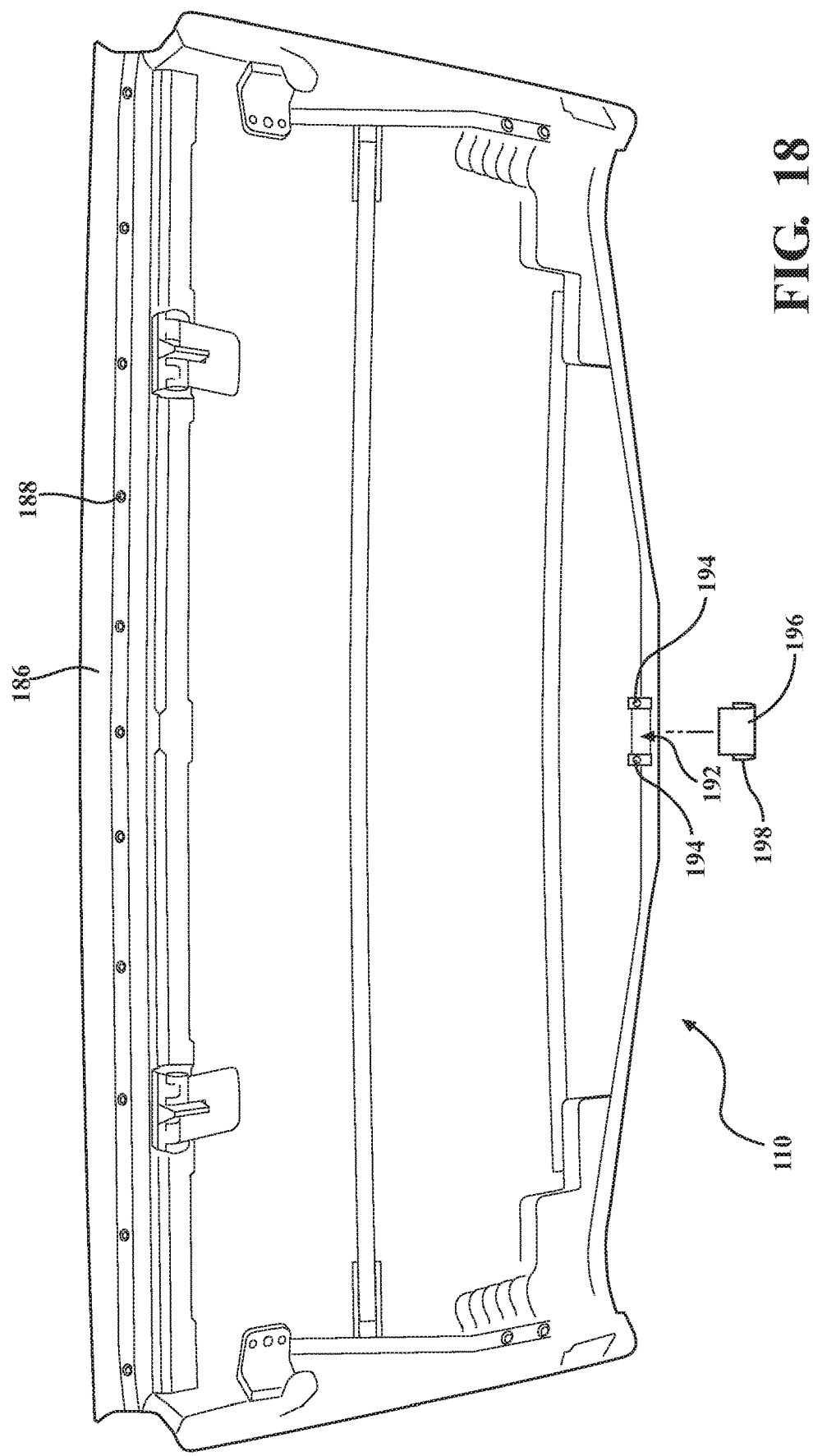
FIG. 18 is a bottom perspective view of the soft top front cover assembly, according to the present invention.
Figure 19:
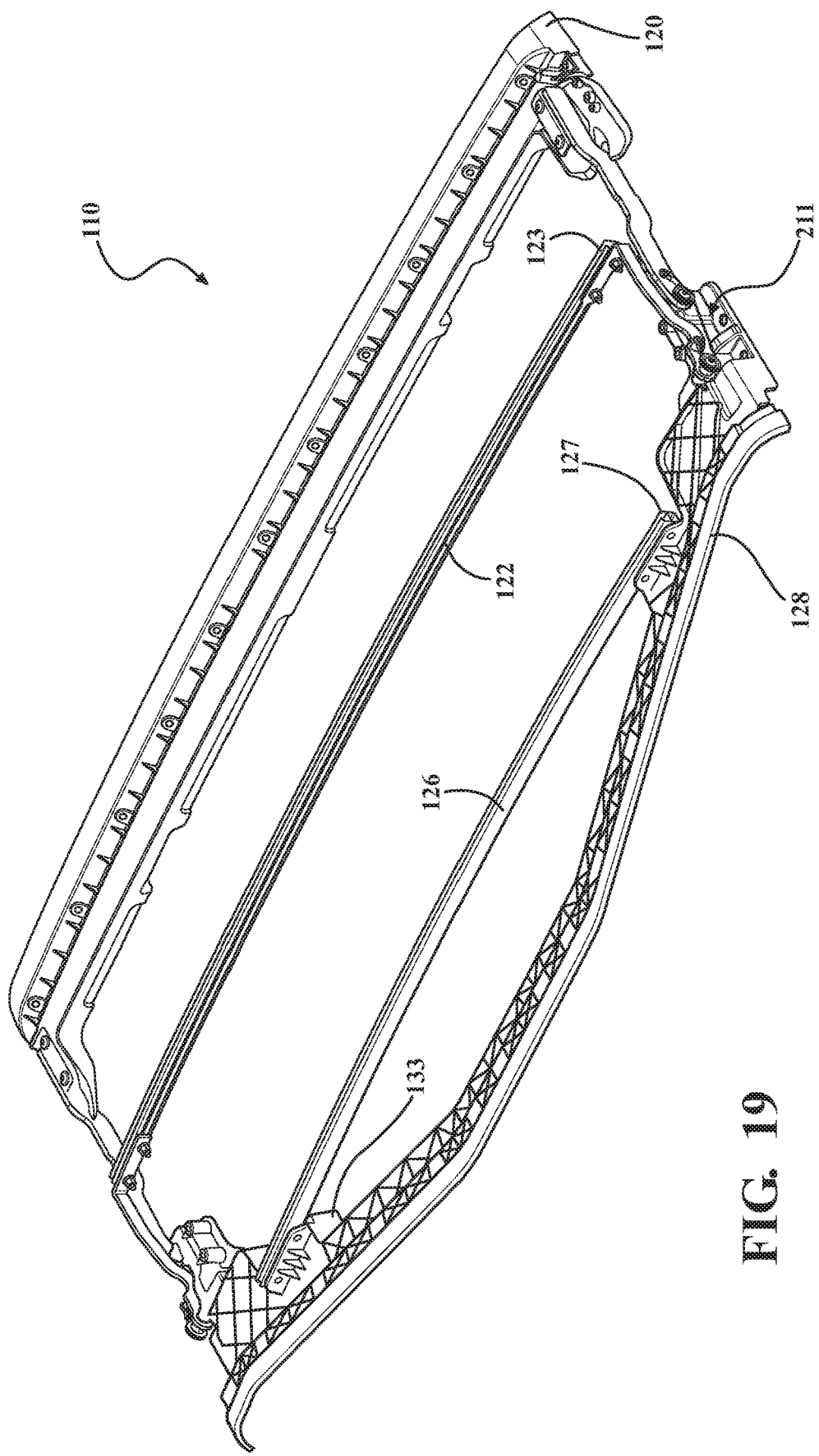
FIG. 19 depicts the soft front top cover assembly including a cable drive according to an aspect of the present invention and rotation between a closed position and at least one open position.
Figure 20:
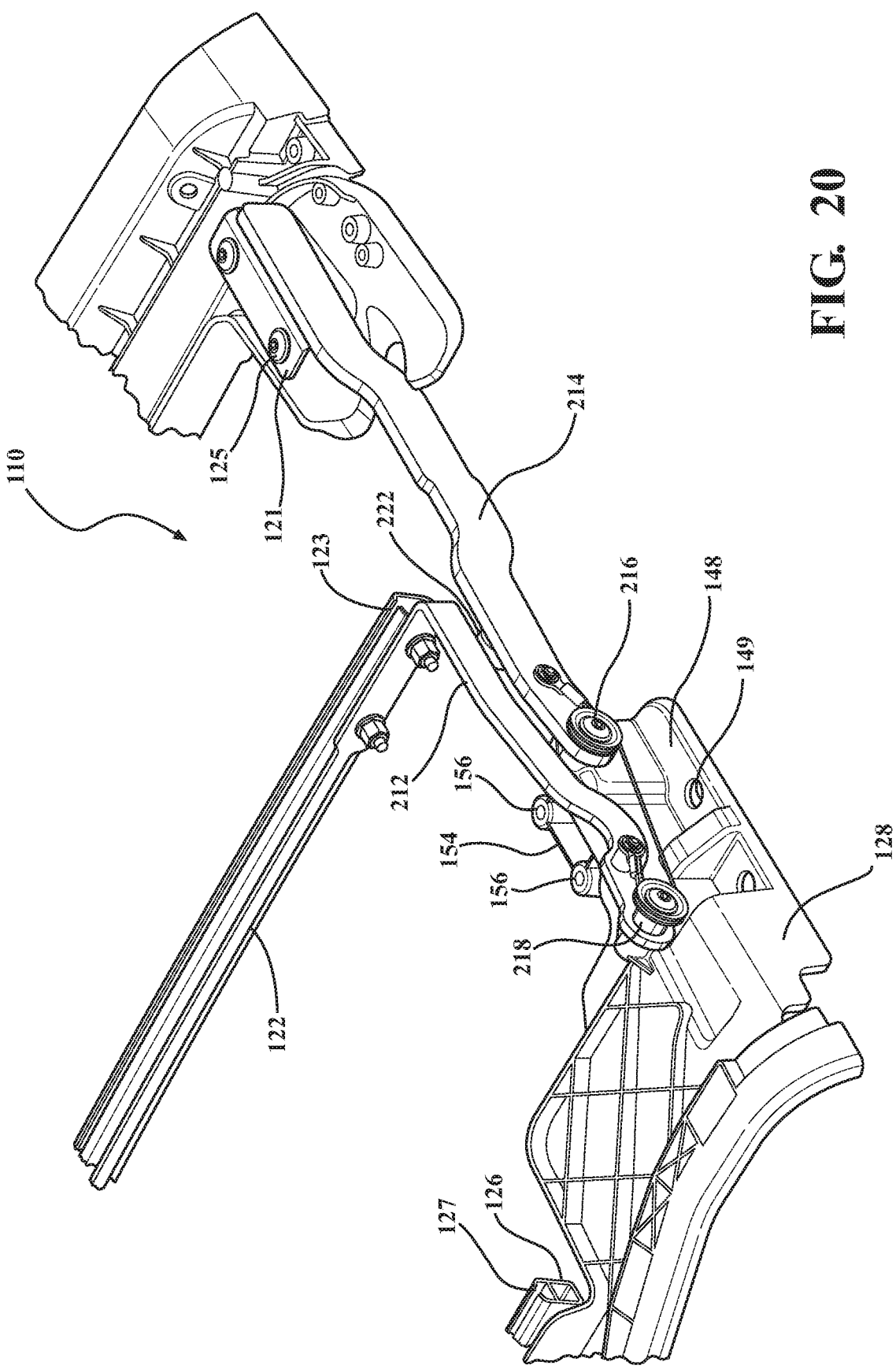
FIGS. 20-21 are enlarged perspective views taken from FIG. 19.
Figure 21:
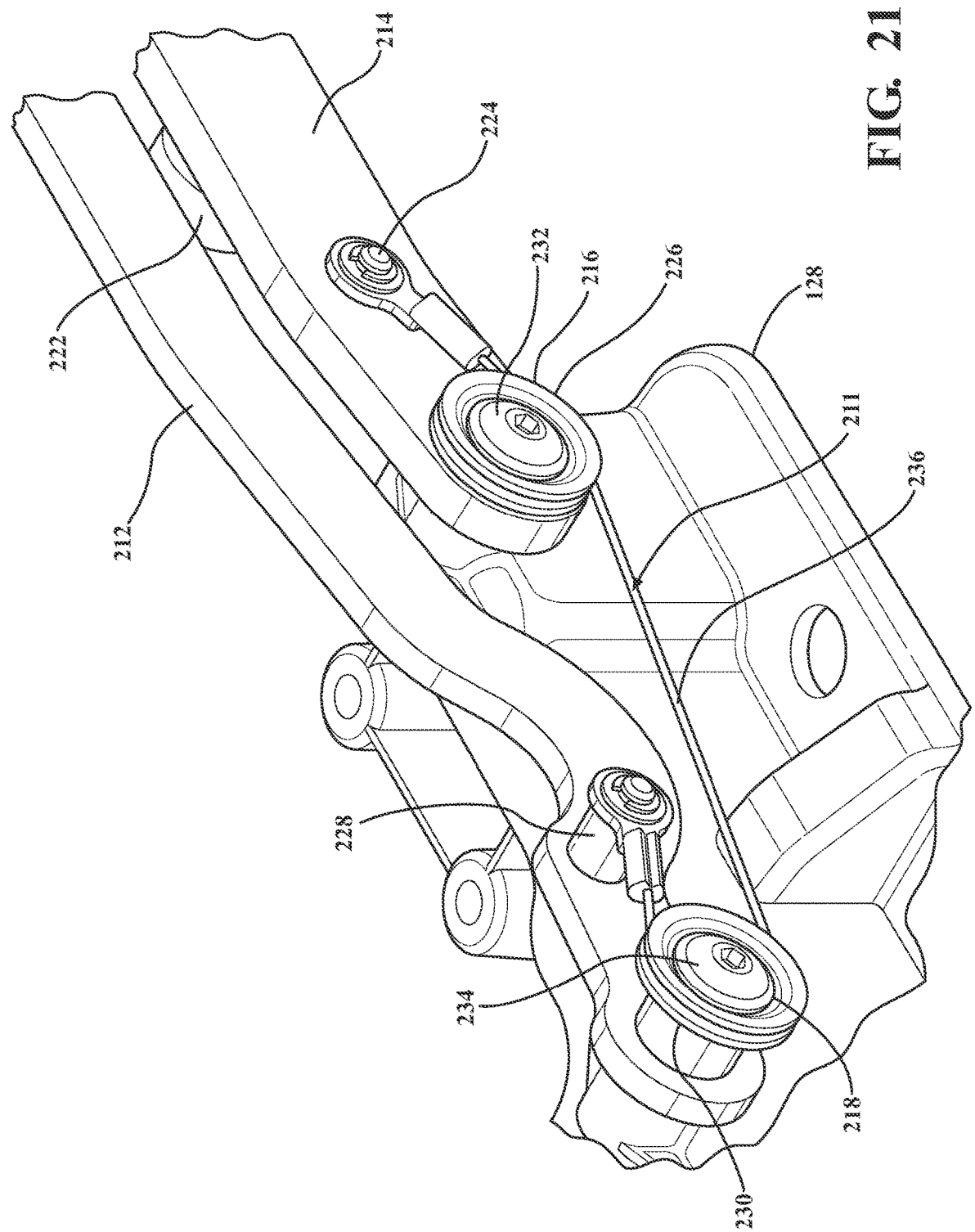

FIGS. 12 and 13 at least one attachment feature is provided. A first attachment portion 150 operably coupled to or integrally formed with the rear header 128, most preferably, with the at least one mounting surface 144. The first attachment portion 150 includes at least one mounting feature 152, preferably, at least one aperture 152, most preferably, at least two threaded apertures 152,152. A second attachment portion 154 operably coupled to or integrally formed with the rear header 128, most preferably, adjacent the second mounting surface 148. The first attachment portion 154 includes at least one mounting feature 156, preferably, at least one aperture 156, most preferably, at least two threaded apertures 156,156. Alternatively, the second attachment portion 154 is operably coupled to or integrally formed with the door rail 140. At least one accessory or other predetermined attachment is operably connected to the first attachment portion 152 and/or second attachment portion 154. By way of non-limiting example, at least one sunshade assessor, retractable sunshade, wind diffuser, mesh top, soft panel, side curtain shade, overhead shade, decorative shade, cross car member, sound bar, grab handle, lighting device, light bar, lock box, storage unit, tray, overhead barrier, vertical barrier, pet barrier, netting, roll bar or any other predetermined accessory and combinations thereof.

Retrofitting a hinge system, e.g., an add-on or aftermarket hinge system, is contemplated depending on the application without departure from the scope of the present invention. Such as, but not limited to, retrofitting a hinge system selectively coupled to the door rail 140 and/or rear header 128. By way of non-limiting example, a hinge system operable to articulate the cover between the open/closed positions.

Each door rail 140 is connected to the rear header 128 (e.g., fastened, mechanical interface, bonded, adhesive, and combinations thereof), preferably, by at least one fastener, most preferably, by a plurality of fasteners 158 (e.g., FIG. 13), bonded, IR welded, mechanical fit, adhesive, etc and combinations thereof. Since the rear header 128 is a separately formed piece from the door rails 140,140, the rear header 128 and door rails 140,140 do not need to ship through the entire supply chain as a larger unit. Selectively shipping disassembled for at least part of the supply chain allows for more efficient packaging footprint/arrangement and allows for a decreased shipping package size since a larger dimensioned packaging container is not required to accommodate a large rear header/door rails assembly. Selectively decreasing the shipping container size for the soft cover assembly of the present invention has a significant advantage and greatly decreases shipping costs, a significant advantage over conventional, bulky soft tops that necessitate larger shipping containers and drives increased shipping costs.

Alternatively, the door rails 140,140 are integrally formed with the rear header 128.

The rear header 128 is preferably one piece, most preferably, injection molded as a single piece. Alternatively, the rear header 128 is a plurality of pieces operably connected together, e.g., at least three pieces. If a plurality of pieces, they are operably connected together by e.g., brackets, fastened, mechanical interface, bonded, adhesive, by at least one fastener, by a plurality of fasteners bonded, IR welded, mechanical fit, adhesive, etc and combinations thereof. The rear header 128 is preferably a lightweight rear header. Most preferably, an injection molded lightweight material. Alternatively, the rear header is at least partially a wireframe. Generally, the rear header 128 is in operable sealing engagement with the vehicle. Typically, the rear header 128 is in operable sealing engagement with the hard top. Preferably, the rear header 128 is in operable sealing engagement with a hard top seal.

Optionally, the door rail 140 has at least one seal, preferably, a plurality of seals. Optionally at least one seal, e.g., rubber bulb seal 160, is provided on at least one location of the door rail 140, e.g., within a channel or drip rail 162. Optionally, at least one seal 164 is provided toward the end of the door rail 140 adjacent the rear header 128 (e.g., see FIG. 15). Optionally, at least one seal 166 is provided toward the forward end of the door rail 140 (e.g., see FIG. 15) relative to the installed vehicle position. Optionally, at least one seal 168 is provided toward the ends of the front header 120 (e.g., see FIG. 14). Optionally, the rear header 128 includes at least one seal, e.g., rear seal, seal to hardtop, secondary seal, etc. All seals have predetermined dimensions, type and material suitable for sealing according to the particular applications.

At least one latch mechanism is provided, shown generally at 170, each including a paddle 172 or latch handle, latch 174 and at least one spring 176. The latch mechanism 170 gives more reach than conventional latch handle devices, e.g., about 0.5 to 1.5 inches greater, preferably, at least about 1 inch greater). This makes latching to the vehicle easier. The paddle 172 is rotatable. The latch 174 is rotatable. The spring 176 is additionally advantageous in that it reduces or eliminates rattling of the paddle 172 because the paddle 172 is biased to not freely move, whereas conventional latches moved around and rattled when not connected to the vehicle because there was nothing preventing that movement. The latch mechanism 170 of the present invention accommodates the new predetermined vehicle interface. The interface is generally a locator for a factory finish hard top. When the assembly 110 is folded to the closed position, the latch mechanisms 170 can be secured to the vehicle, e.g., vehicle windshield header. In operation, each latch handle 172 is pivoted, e.g., pivoted down, until the hook 174 engages a respective footman loop or other vehicle structure. The latch 172 is pivoted back up to complete the securement of the assembly 110 to the vehicle header in the closed position.

At least one cable 178 is operably coupled to at least both sides of the cover 19 (fore/aft in installed position). The cable 178 is operably attached toward one end 180 to the door rail 140 or rear header 128 and at the second end to the front header 120. The cable 178 is preferably located in a pocket 182 formed along the edge of the cover 19, e.g., preferably sewn pocket. The second end of the cable can run at least partially cross car and operably couple to the rear header 128 by at least one spring for tensioning the top cover 19. Alternatively, the cable runs at least partially cross car and is operably coupled to the front header 120 by at least one spring for tensioning the top cover 19. Alternative attachments attachment locations and cable locations are contemplated depending on the application without departure from the scope of the present invention.

Preferably, at least one trim 186 is connected to the front header 120, e.g., by a plurality of fasteners 188 received in a plurality of apertures 190, assisting in trapping the cover 19 material and trimming the leading edge of the first bow 120. A lip can be formed along the header 120 to operably retain the cover 19, preferably, wrapped around the front edge and sandwiched between opposing features of the header, e.g., using bracket(s), extrusion(s), molded part(s), adhesive, fasteners, etc. The cover 19 is operably connected to the rear header 128, preferably, wrapped around the rear edge and sandwiched between opposing features of the header 128, e.g., using bracket(s), extrusion(s), molded part(s), adhesive, fasteners, etc.

At least one rear clamp mounting portion is provided, shown generally at 192. Preferably, the rear clamp mounting portion 192 includes at least two apertures 194,194. At least one rear clamp 196 is operably connected to the rear clamp mounting portion 192 using a plurality of fasteners, e.g., bolts, screws, knobs, latches, etc. Preferably, the rear clamp 196 includes at least one flange 198. Most preferably, the rear clamp 196 includes at least one flange 198 fitting under the cross car member (e.g., at a substantially central cross car location to help secure the assembly 110 to the cross car member.

Incorporating tie down straps or any suitable hold down mechanism, parts or components when the assembly 110 is in the open position is contemplated depending on the application without departure from the scope of the present invention.

In accordance with an aspect of the present invention, a fastener arrangement (e.g., screw in bushing, rivet, threaded fastener, elbow bolt, threaded insert etc and combinations thereof) provides for all of the respective pivotal connections to allow the top to be cycled open/closed. However, alternative pivot joint mechanisms can be used suitable for cycling the top open/closed depending on the application without departing from the scope of the present invention. Elimination of bushings and screw arrangements is contemplated without departure from the scope of the present invention. Incorporating at least one attachment bracket, e.g., including pivot points, is contemplated depending on the application without departure from the scope of the present invention. The pivot points are preferably integrated. More preferably, the pivot points are integrated molded in pivot points. It is contemplated that the pivot points are assembled.

FIGS. 30-33 depict an exemplary connector arrangement portion, indicated generally at 400, e.g., a screw in bushing arrangement that provides for the pivots on the molded rear header 128 for the front side rail 118 and for the 2-bow pivot link 112. The connector is threaded on the outside for attachment to the rear header. The connector is also threaded on the inside for attachment of a fastener, preferably shoulder bolt, for forming the pivot with the front side rail 118 and for the 2-bow pivot link 112, respectively. Thus, at first and second pivot points 115,117, respectively, there is includes a respective threaded insert 402 that is used to attach the front side rail 118 to the rear header 128 and to attach the 2-bow pivot link 112 to the rear header 128. Each threaded insert 402 is inserted into the rear header 128. Preferably, each threaded insert 402 includes outer threads 404, and is screwed into the rear header 128, e.g., screwed into a respective aperture 403 of the molded rear header 128. Each threaded insert 402 also included inner threads 406 to receive a respective threaded fastener 408, preferably a shoulder bolt. The front side rail 118 and 2-bow pivot link 112 each include an aperture to receive one of the fasteners 408. The threaded inserts 402 are threaded into the rear header 128, then the aperture of the respective front side rail 118 and 2-bow pivot link 112 are aligned with the respective threaded insert 402, then the respective fastener 408 is put through the aperture and screwed into the threaded insert 402. Preferably, each fastener 408 is shoulder bolt or other suitable fastener to include a greater diameter portion 410 to keep the respective front side rail 118 and 2-bow pivot link 112 at the joint 115,117 while allowing rotation of the front side rail 118 and 2-bow pivot link 112 for moving the articulating portion 124 between the closed and open positions.

Referring to FIGS. 3-26 and 30-33 generally, the left half of the assembly 110 and corresponding features are substantially mirror image/symmetrical to the right half of the assembly 110 and corresponding features depicted in the figures or described herein.

Referring now more particularly to FIGS. 19-25, the soft front cockpit cover assembly 110 is provided, wherein like numbers indicate like parts, and wherein the description of which are incorporated herein in their entirety, is provided with an alternative cable drive system indicated generally at 211. There is provided the soft front cockpit cover assembly 110 with a 2-bow pivot link 212 that is not connected to a 2-bow drive link. There is no 2-bow drive link in accordance with the present invention.

The previous disclosures are incorporated here in their entirety; thus, it is understood that the assembly 110 is adaptable depending on the application and any of the aforementioned features and combinations can be incorporated without departure from the scope of the present invention.

FIGS. 19-22 depict the assembly 110 in a closed position or closed roof top position covering or closing off the front roof top opening, e.g., preferably for a sport utility vehicle. The front header 120 is operably connected to the front side rail 214 (e.g., at least one fastener connecting the bracket 121 of the first side rail 214 to the header 120). The front side rail 214 is connected at a first pivot point 216, preferably to the rear header 128.

The front side rail 214 is connected at the least one first pivot point 216, preferably a single pivot point 216 to the rear header 128. The 2-bow pivot link 212 is connected at at least one second pivot point 218, preferably a single pivot point 218 to the rear header 128. The first pivot point 216 is preferably located at a position forward to the second pivot point 218 with respect to the front of the vehicle. It is understood that alternative pivot 216,218 locations suitable for pivoting the articulating portion 220 depending on the application is contemplated without departure from the scope of the present invention (e.g., either or both pivots alternatively provided on the door rail 140). It is understood that the incorporating the threaded insert and fastener arrangement as set forth in FIGS. 30-33 and explained previously is contemplated without departure from the scope of the present invention.

Preferably, the least one additional bow 126 is a fabric management bow 126. Most preferably, the at least one additional bow 126 is a fabric management bow operably coupled to the soft top cover 19 and operably connected to a rear header 128, most preferably, fixedly connected to the rear header 128 such that the bow 126 has a fixed location. It is understood that more than one fabric management bow 126 on the rear header 128 (or any other predetermined location(s) of the assembly 110) can be provided depending on the application without departure from the scope of the present invention. Preferably, at least one channel 127 (e.g., see FIG. 4) is provided to operably attach the cover 19 to the rear header 128 (or any other predetermined location(s) of the assembly 110). The at least one additional bow 126 is preferably fastened to the rear header, e.g. at least one screw, bolt, bracket etc).

The fabric management bows 122,126 manage the top cover 19 as the assembly 110 folds to the open position. The fabric management bows 122, 126 also minimize fabric movement in the closed position, which alleviates wind flap noise, in addition to managing the cover 19 during articulation and in the open position.

The rear header 128 operably seals with the rear top cover, e.g., hard top cover, as described previously.

A 2-bow stop 222 is operably connected to the articulating portion 220, preferably, to the front side rail 214.

The cable drive system 211 includes at least one first cable anchor 224 operably connected to the articulating portion 220, preferably, to the front side rail 214. The cable drive system 211 includes at least guide 226 (e.g., pulley wheel) operably connected to the articulating portion 220, preferably, to the front side rail 214. The cable drive system 211 includes at least one second cable anchor 228 operably connected to the articulating portion 220, preferably, to the 2-bow pivot link 212. The cable drive system 211 includes at least one second guide 230 (e.g., pulley wheel) operably connected to the articulating portion 220, preferably, to the 2-bow pivot link 212 and rear header 128. Most preferably, the at least one first guide 226 also provides the first pivot point 216. Most preferably, the at least one second guide 230 also provides the second pivot point 218. Preferably, at least one fastener 232 connects the first guide 226 to the front side rail 214 and to the rear header 128. Preferably, at least one fastener 234 connects the second guide 230 to the 2-bow pivot link 212 and to the rear header 128. A cable 236 of predetermined fixed length is operable connected toward one end to the first cable anchor 224, and operable connected toward the other end to the second cable anchor 228. The guides 226,234 226,230 are a predetermined distance apart. The cable 236 at least partially loops the first guide 226 generally adjacent the first anchor 224, and at least partially loops the second guide 230 located adjacent the second cable anchor 228 to tension the cable system 211.

Figure 22:
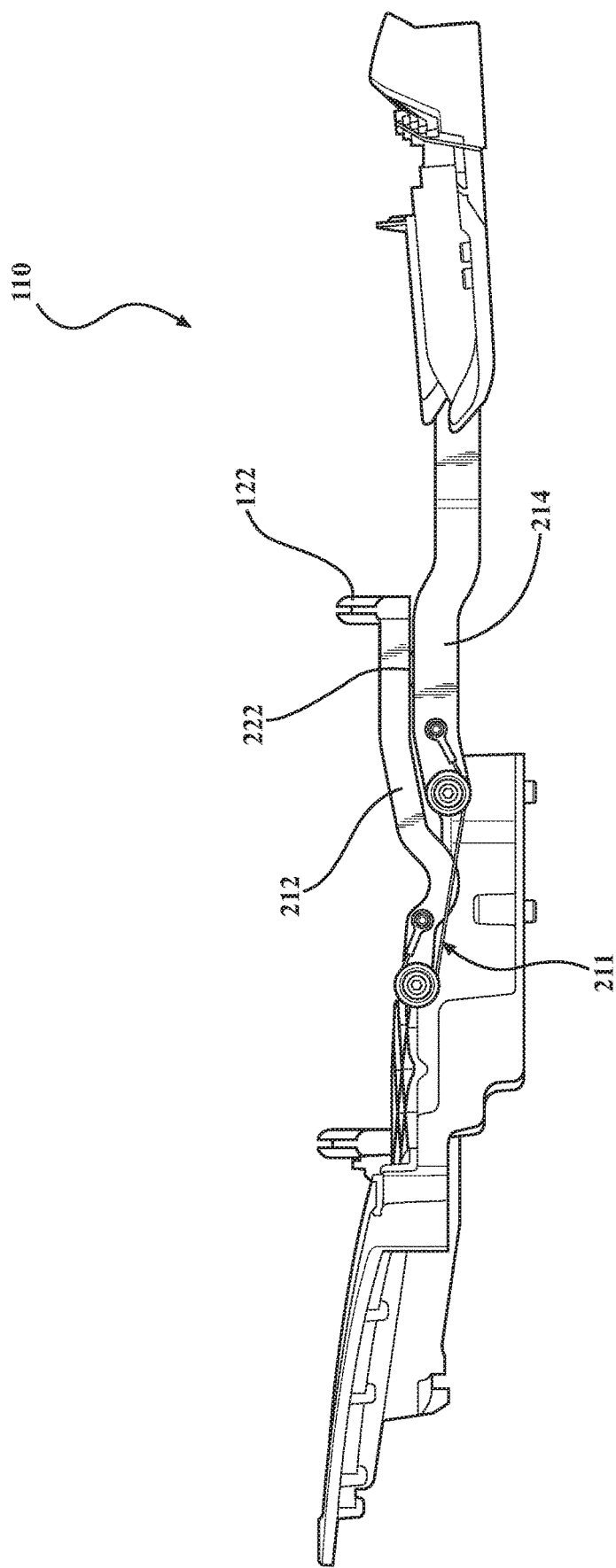
FIG. 22 is a side elevation view of FIG. 19.

FIG. 22 depicts the assembly 110 in the closed position. The 2-bow stop 222 is attached to the front side rail 214 and rests on the underside of the 2-bow pivot link 212, thereby controlling the 2-bow 122 height. There is no 2-bow guide block. The 2-bow pivot link 212 is operably connected to the 2-bow 122. The at least one additional bow 126 is operably connected to the rear header 128, e.g., as described previously. The at least one rear header 128 is operably connected to the cover 19, e.g., as described previously. The door rail 140 is operably connected to the vehicle, e.g., as described previously (e.g., sport bars). The rear header 128 is operably connected to the door rails, e.g., as described previously. At least one cable 178 on each side of the cover 19 is part of the assembly 110, e.g., as described previously.

Figure 23:
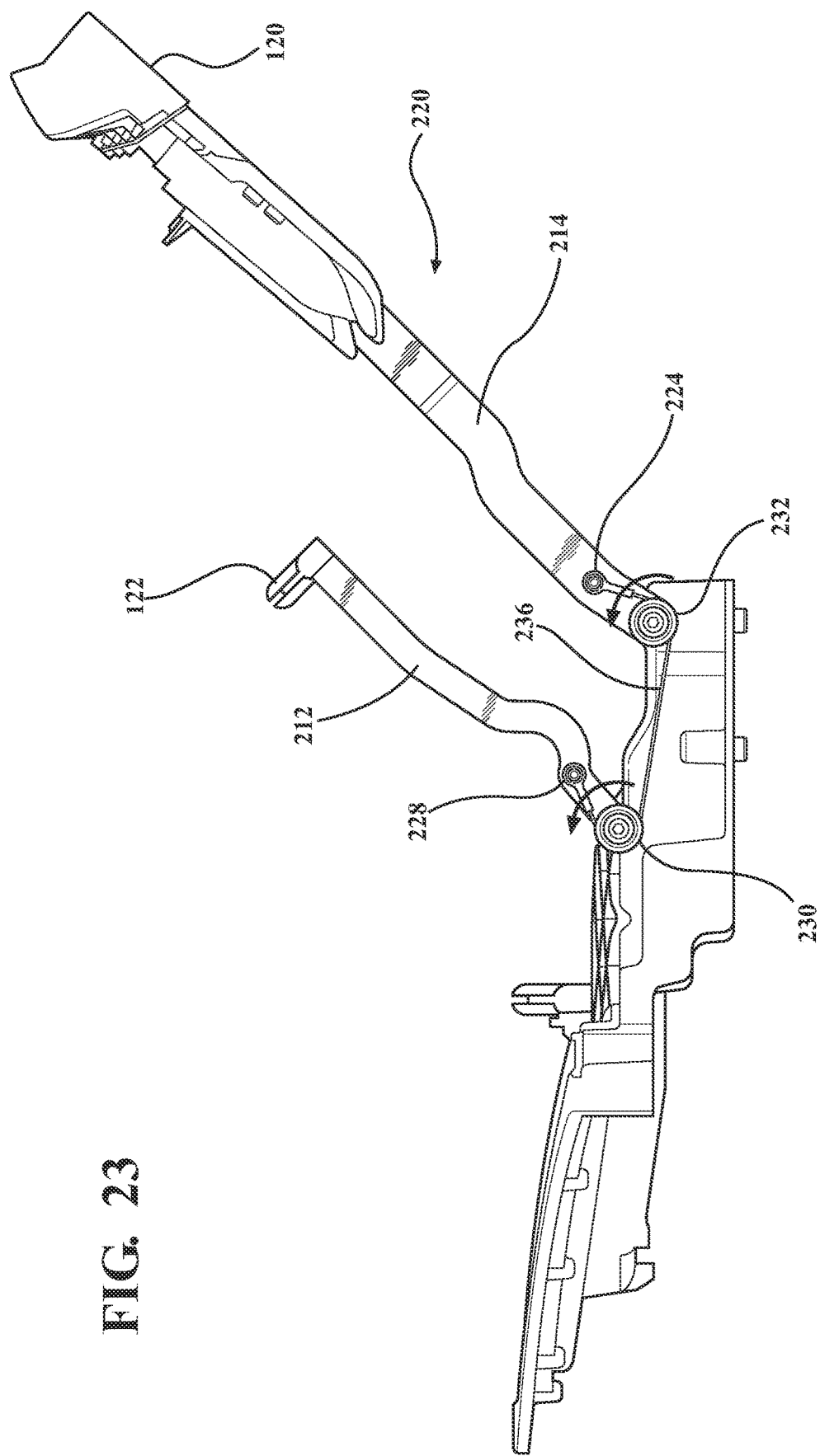
FIGS. 23-24 are side elevation views depicting the soft front top cover assembly of FIG. 19 in accordance with the present invention rotating between a closed position and open position.

FIG. 23 depicts the assembly 110 in a partially open position. In an exemplary operation, as the top mechanism is cycled into the open position, the cable assembly 211 that is fixed to the front side rail 214, rotates around the pulley wheel 232 at the front side rail pivot joint 216. Since the cable assembly 211 is of fixed length, it too rotates about the second pulley wheel 230 at the 2-bow pivot link 212. With the cable 236 fixed to the 2-bow pivot link 212 at the anchor point 228, the cable 236 then pulls on the second anchor 228 thereby rotating the 2-bow pivot link 212.

Figure 24:
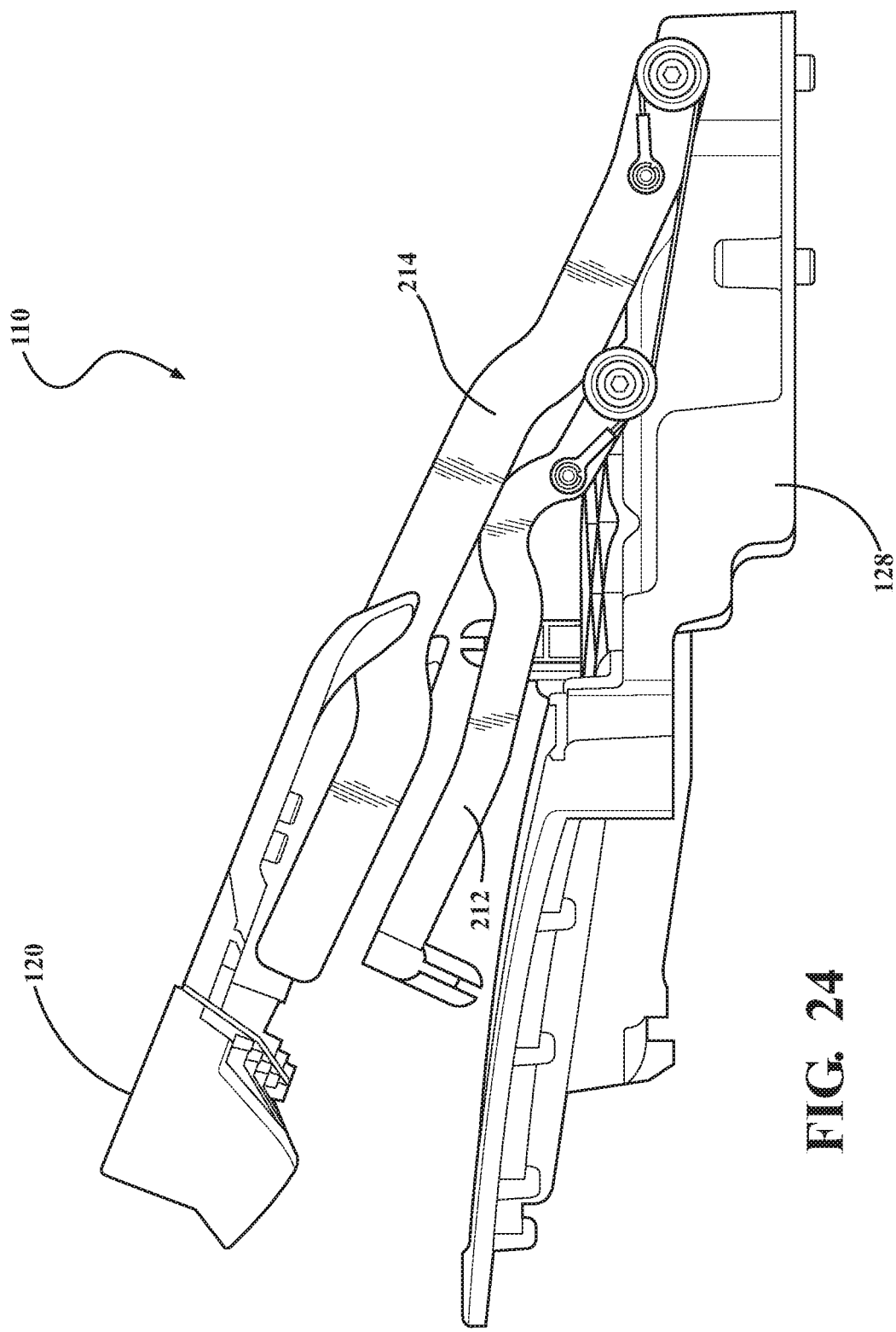

FIG. 24 depicts the assembly 110 in an exemplary open position (e.g., open sunroof position).

Figure 25:
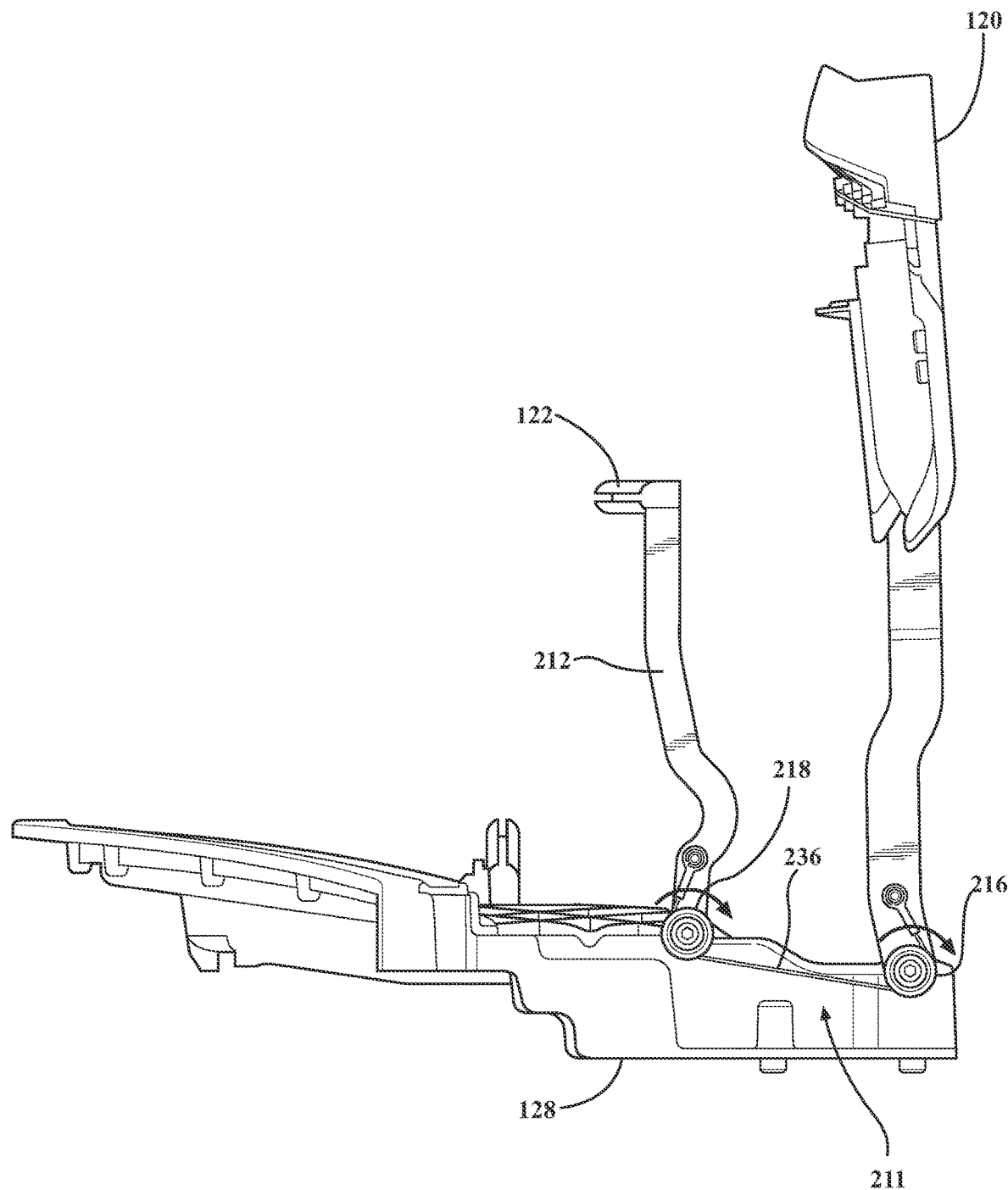
FIG. 25 is a side elevation view depicting the soft front top cover assembly in accordance with the present invention rotating toward the closed position.

FIG. 25 depicts the assembly 110 in a partially closed position. Control of the 2-bow assembly is not required to close the top assembly 110 since the top cover fabric 19 is attached to the 2-bow 122 and the top header 120. As the top 110 is cycled to the closed position, the fabric 19 pulls the bow assembly about the 2-bow pivot link rotation point 218.

The left half of the soft panel top cover assembly 110 and corresponding features are substantially mirror image/symmetrical to the right half of the 110 and corresponding features depicted in the figures.

Referring to FIGS. 3-25 and 30-33 generally, the soft front cockpit cover assembly 110 is preferably a foldable and sealable with a hard top roof portion of the vehicle. The soft panel top assembly 110 is connected to a vehicle. The vehicle includes a windshield frame with side members, e.g., sport bars, extending therefrom and a cross bar or cross member operably connecting the side members substantially adjacent the rear of the driver/passenger compartment, although the top is operably adaptable for any other location contemplated. The soft panel top assembly 110 folds back to give the occupant a quick and easy open air effect, e.g., lightweight and easily operated at a short interval stop, without completely removing the soft panel top assembly 110 from the vehicle. Folding the soft panel top assembly 110 between a closed position and at least one open position is also achievable without the occupant needing to leave the vehicle and eliminates removal and storage of roof panels from the vehicle. Once cycled to the open position, the soft panel top assembly 110 also does not require strapping the assembly down to maintain open air positioning. Further, the soft panel top assembly 110 includes built in stops to set the height of the 2-bow. A 2-bow drive solution without 2-bow drive link is provided. The assembly 110 geometry generally follows the hardtop contours. The assembly 110 is in sealing engagement against the hardtop's seal(s). When closed, assembly 110 also seals with the vehicle windshield frame seal(s). Preferably, bushing and fastener arrangement is used for all of the respective pivot points and pivot joints. However, alternative suitable pivot mechanisms can be used without departing from the scope of the invention depending on the particular application.

The first bow 120 is adapted for releasable attachment to the windshield frame for opening and closing the assembly 110. The first bow 110 has at least attachment mechanisms, e.g., latches, paddles/spring/hook mechanism, or any other suitable attachment mechanism, connected thereto that have a hand actuated clamping arrangement to selectively connect to the windshield frame. The first bow is preferably molded plastic, e.g., plastic with steel reinforcement and comprises two attachment mechanisms, which when in the closed position attach to opposing features of the vehicle, e.g., metal loops, footman loops, molded parts, stamped parts, or any other vehicle interface etc, generally located under the visors of the vehicle, and when cycling to the open position, travel with the first bow. The attachment mechanisms provide for securing closure of the top to the existing windshield frame and are readily released by an operator for opening of the assembly. Optionally, at least one limiting stop is used to set the height of the articulating portion or any link thereof in the open or closed positions. In accordance with an aspect of the present invention, the cover 19 is sewn and/or adhered or otherwise attached to portions that fit within the respective channels 123,127, e.g., an extrusion is stitched or sewn and/or adhered to the cover 19. Depending on the application the extruded materials are generally polypropylene, polyethylene, flexible polyvinyl chloride, structural acrylonitrile butadiene styrene, thermoplastic elastomer of operable densities or other material suitable for making the extrusion (bulb portion and attachment flange). If more than one extruded material is used the extruded materials are compatible materials to melt bond to one another under pressure depending on the application. The rear header 128 has a plurality of attachment features for coupling to the cross member, e.g., at least one rear clamp, at least one rear clamp mounting portion 194 and/or at least two locating brackets connected to the rear header 128, e.g., bottom thereof, by at least two fasteners, which interface with the cross member and/or hardtop to keep the rear header from lifting off the cross member in the installed position. The at least two feet 130 operably locate to the cross member or hardtop, e.g., including a lip to a leading edge. Preferably, the feet generally set the rear header height relative to the hardtop. For installation, preferably, no modification to the hardtop, no drilling of any holes in the vehicle, or changing of any existing remaining components is required. The manufactures front cockpit panels are removed and the soft panel top assembly 110 is installed. Preferably, the door rails 140 can ship separate from the rear header 128, meaning that the door rails 140 do not need to be connected to the rear header 128 or are not integrally formed with the rear header 128—thus, allowing significant decreases in shipping container size and shipping costs. Alternatively, the soft panel top assembly 110 ships in the entire supply chain as a rear header connected to or integrally formed with door rails. The rear header 128 is a rear header closeout operable to engage at least one seal existing on the hard top portion and provides a weatherproof seal, e.g., under compression with a bulb seal, lip, mucket, gasket or any other suitable seal to prevent leaks between the hard top portion and assembly 110. The assembly 110 can also include at least one seal. It is within the scope of the invention to manufacture the rear header 128 as a wireframe (e.g., bent wire frame welded together), lightweight molded plastic, or other suitable lightweight material and configurations and/or combinations thereof suitable to withstand predetermined strength requirements and to sealingly engage with the hard top portion, depending on the particular application without departing from the scope of the invention. The rear header 128 is a single piece or plurality of pieces. Preferably, the rear header 128 has at least three lightweight molded pieces operably connected together. More preferably, the rear header 128 is a single piece. Most preferably, the rear header 128 is a single piece and the door rails 140 are connected thereto, e.g., at some point in the supply chain or by the consumer. The assembly 110 is an after-market assembly and/or an original equipment manufacturer component. By way of non-limiting example, the manufactured door rails 140 ship unassembled to the rear header 128 to reduce shipping costs. At a final assembly facility, the door rails 140 are connected to the rear header 128 and delivered to the OEM, e.g., supporting just-in-time line requirements. This significantly reduces unit costs because the packaging shipping size is smaller to realize lower shipping rates. Preferably, a plastic retainer slides over a metal backing piece connected by a fastener to keep the cover 19 connected on the rear header 128, e.g., the cover is sandwiched, and/or secured with a plurality fasteners. Similarly, preferably, the front header 120 has a similar metal backing and plastic retainer connecting the cover 19 to the header 120, e.g., the cover is sandwiched. The cover 19 is preferably secured to the rear header 128 and/or front header 120 without snaps. The assembly can also include a plurality of seals, e.g., at least one header seal, at least one door rail seal, at least one rearward door rail seal, at least one drip rail seal. The drip rail can include at least one aperture for draining water. Optionally, a seal, e.g., lip seal, bulb seal, edge seal, edge gimp, or any suitable seal, is operably connected to the cover 19 coupled to at least the rear edge surface of the rear header 128. By way of example, the lip seal is sewn and/or bonded to the cover 19 and sandwiched between the cover 19 and rear header 128 at the rear of the assembly 110. By way of non-limiting example, the seals are an open cell foam, a closed cell foam material, EPDM (ethylene propylene diene monomer), TPE (thermoplastic elastomers), TPV (thermoplastic vulcanizate), etc., a foam rubber, an extruded rubber, a formed/molded rubber mucket, and/or a silicone material. The seals are preferably foam seals, most preferably soft sponge EPDM closed cell foam. Alternatively, at least one of the pairs of seals are a rubber mucket which is more robust. It is understood that the present invention is suitable for two door and four door vehicles. A headliner material or other dampening material(s) for reducing noise in the cockpit or improved climate control is contemplated without departure from the scope of the present invention. The headliner/dampening material is operably connected on the cockpit side of the cover, e.g., sewn. Alternatively, the headliner/dampening material is inserted into at least one pocket or sandwiched between layers of cover material. The 2-door and 4-door descriptions and drawings described herein are not limiting. It is understood that any embodiment, and combinations thereof, described herein can be modified and is/are utilizable on any convertible, 2-door or 4-door vehicle. The present invention is directed to a stowable soft top assembly and operably adoptable for any vehicles and vehicle types, e.g., sliding and/or folding soft top assembly for 4-door and 2-door SUVs, all-terrain vehicles, utility task vehicles, off road vehicles, pickup trucks, Jeeps™ pickups, open air pickup trucks, any motor vehicles, etc. The left half of the soft panel top cover assembly 110 and corresponding features are substantially mirror image/symmetrical to the right half of the 110 and corresponding features depicted in the figures. The pivot points are integrated. Preferably, the pivot points are integrated molded in pivot points. It is contemplated that, alternatively, the pivot points are assembled. Providing at least one fabric management bow, e.g., fixed and/or articulating bow(s), is contemplated without departure from the present invention. The cover 332 is a predetermined material, e.g., soft material, fabric, twill acrylic fabric or sailcloth fabric.

Referring now to FIGS. 26-29 generally, a soft front cockpit cover assembly 310 is provided. There is provided the soft front cockpit cover assembly 310 with a 2-bow pivot link that is not connected to a 2-bow drive link. There is no 2-bow drive link in accordance with the present invention. The previous disclosures are incorporated here in their entirety; thus, it is understood that the assembly 310 is adaptable depending on the application and any of the aforementioned features and combinations can be incorporated without departure from the scope of the present invention.

The assembly 310 incorporates a pair of door rails 312 and a rear header 314. The rear header 314 is preferably at least two pieces, preferably, at least three pieces, operably connected together (e.g., molded pieces connected by at least one fastener, bracket, adhesive, snap fit, snap fit hook(s), screws, rivets, infrared welding, welding or any type of suitable attachment and combinations thereof). Alternatively, the rear header 314 is a single piece (e.g., integrally molded rear header 314). Each door rail 312 is operably connected to the vehicle, e.g., sport bars 315, e.g., same or similar as described in greater detail previously. The door rails 312 are preferably separate pieces operably connected to the rear header 314. The rear header 314 is operably connected to the vehicle, e.g., as described in greater detail previously.

FIGS. 26-29 depict the assembly 310 rotating back from a closed position to an open position.

Figure 26:
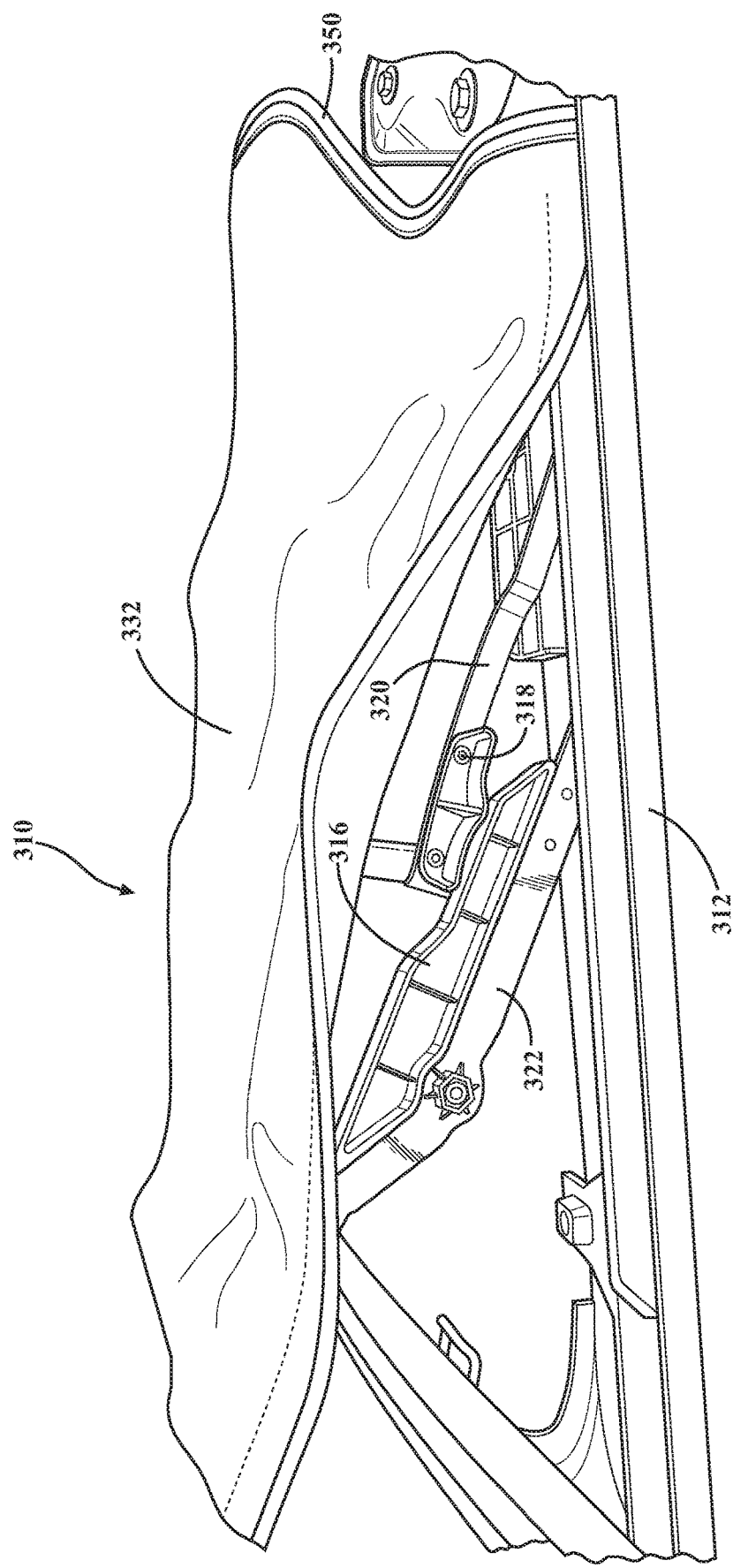
FIG. 26 depicts a soft front top cover assembly in accordance with an aspect of the present invention.

FIG. 26 illustrates the top in a partially open position. As the top mechanism is cycled into the open position, a 2-bow guide block 316 maintains contact, for at least part of the cycle, with a 2-bow stop 318, thereby lifting and rotating a 2-bow pivot link 320 into the open position. The 2-bow guide block 316 is operably connected to a front side rail 322. It is understood that, alternatively, the 2-blow block 316 is connected to the 2-bow pivot link 320 and the 2-bow stop 318 is connected to the front side rail 322. Any other attachment locations for at least one 2-bow block 316 and at least one 2-bow stop 318 suitable for cycling the assembly 310 without a 2-bow drive link (e.g., without a metal link connected to the front side rail 322 and 2-bow pivot link 320) is contemplated depending on the application without departure from the scope of the present invention.

Figure 27:
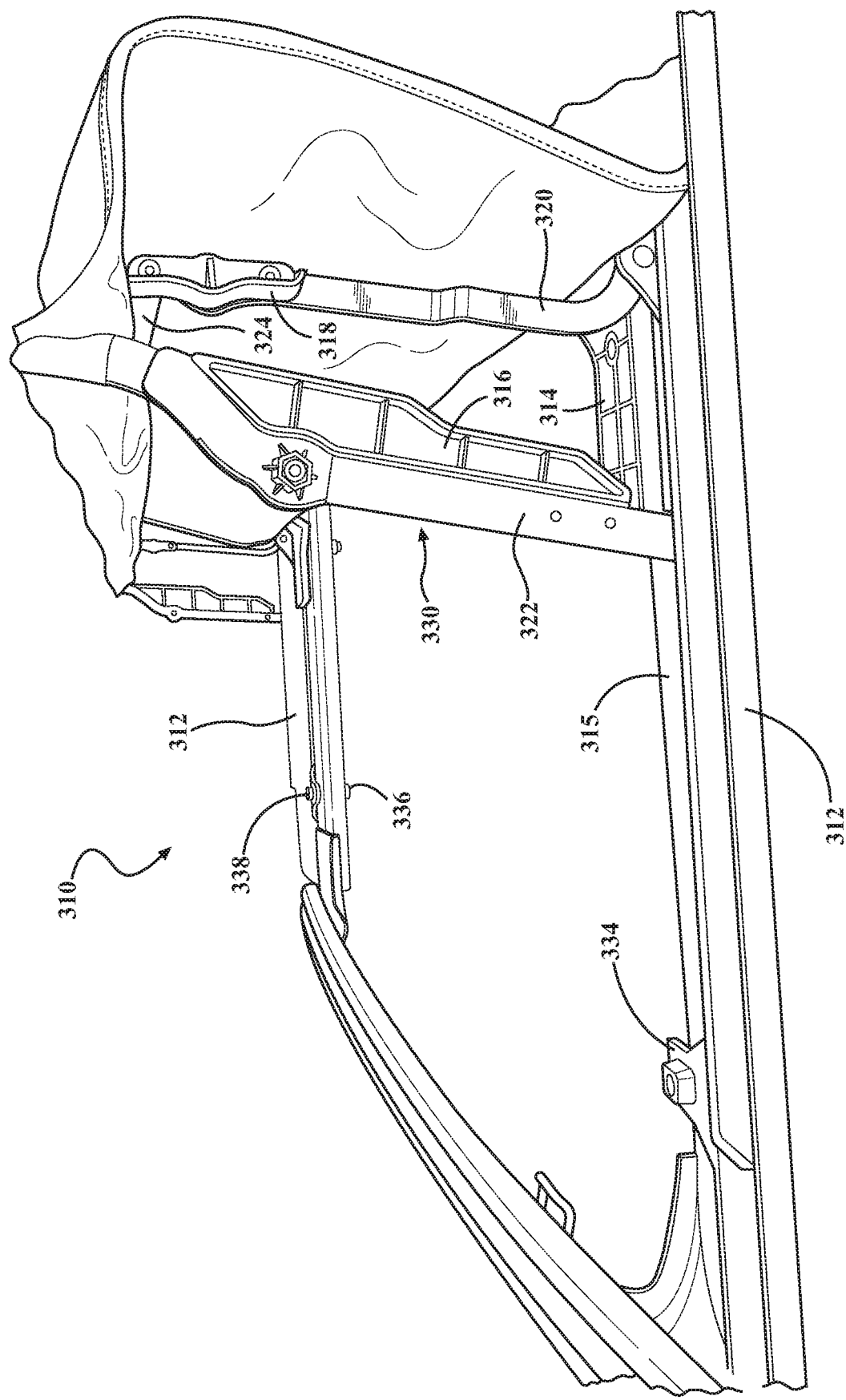
FIGS. 27-28 are perspective views depicting the soft front top cover assembly of FIG. 26 rotating generally between a closed position and an open position, according to an aspect of the present invention.
Figure 28:
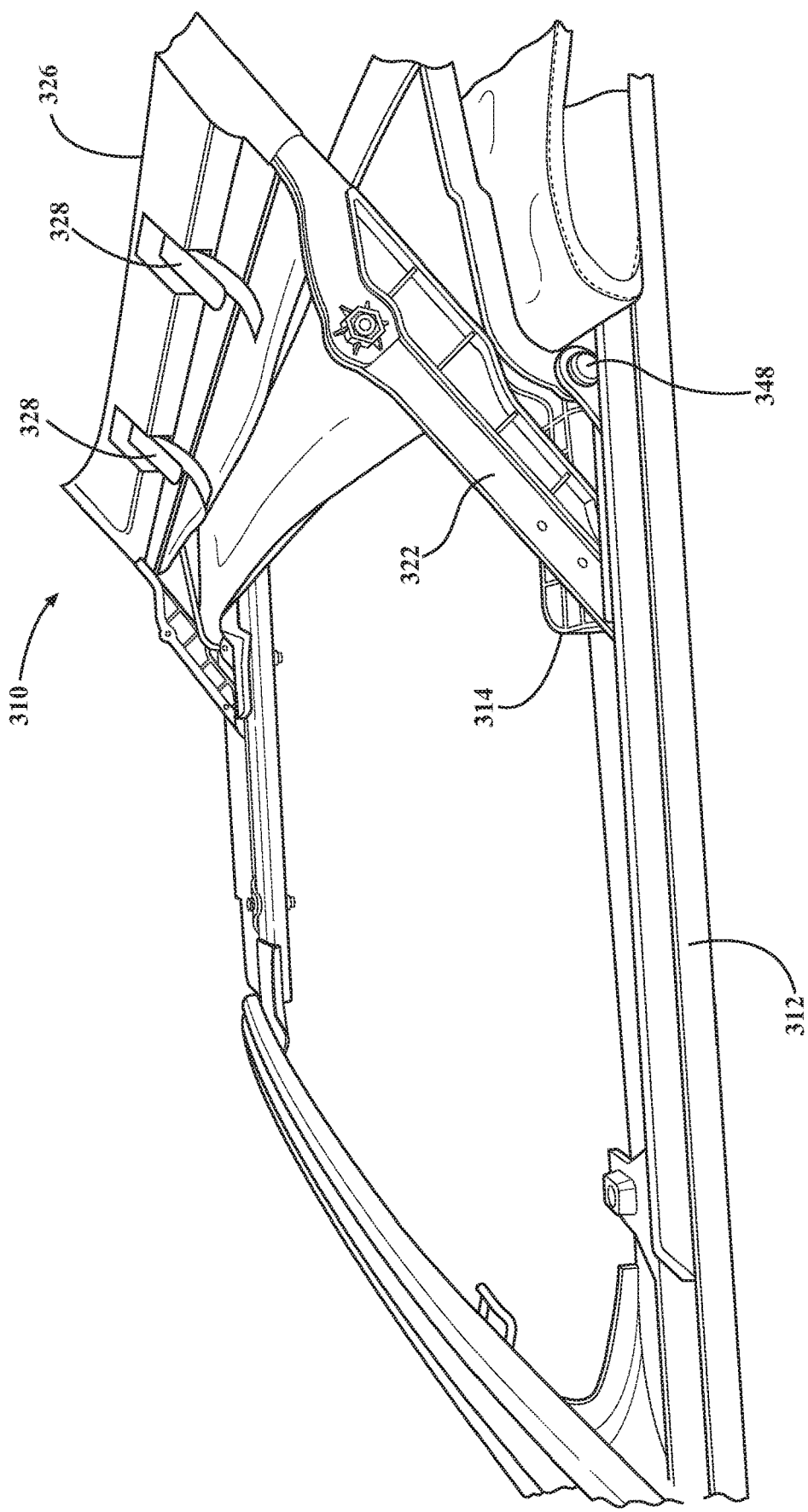
Figure 29:
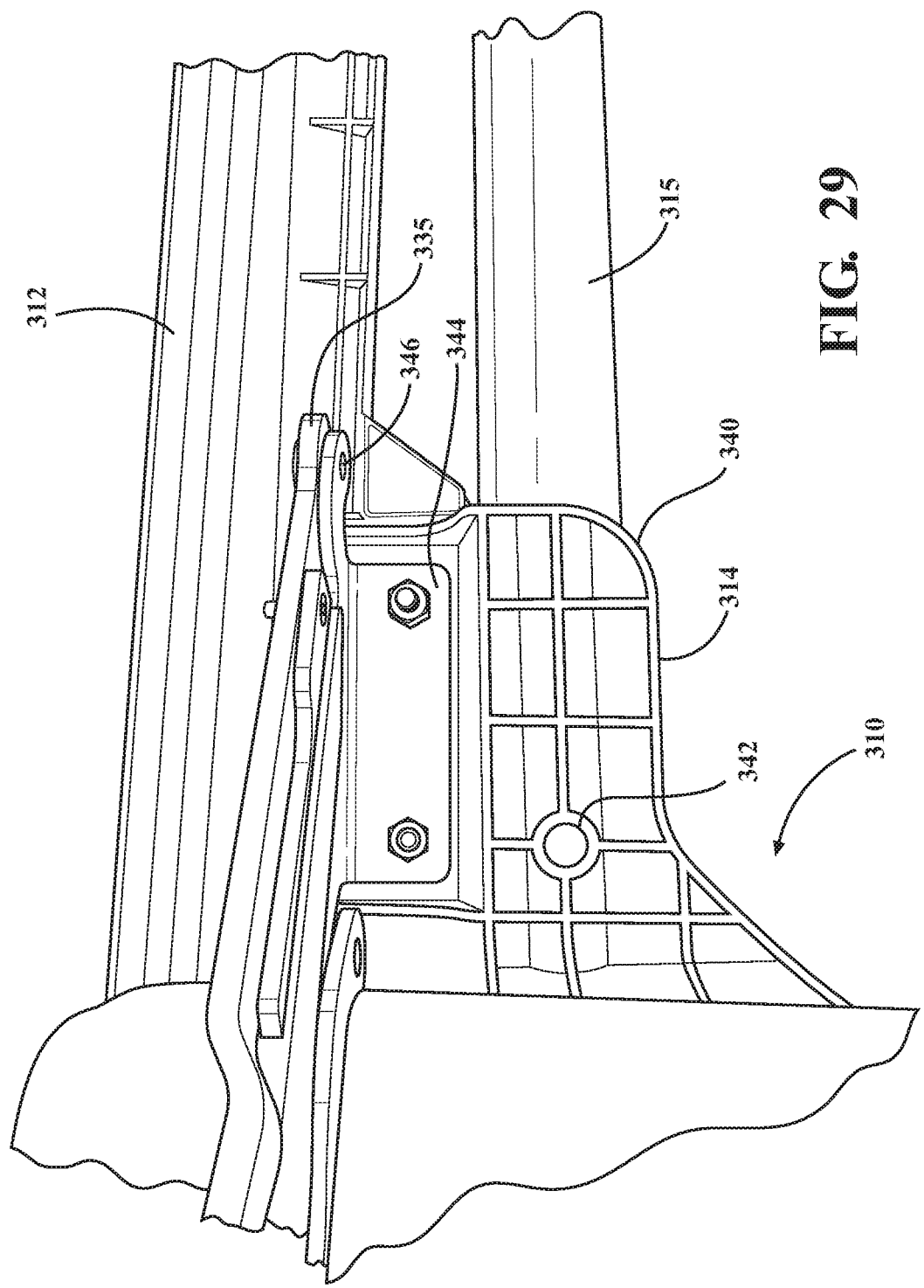
FIG. 29 is a top plan view of an attachment area of a rear header of the soft front top cover assembly of FIG. 26, according to an aspect of the present invention.
Figure 32:
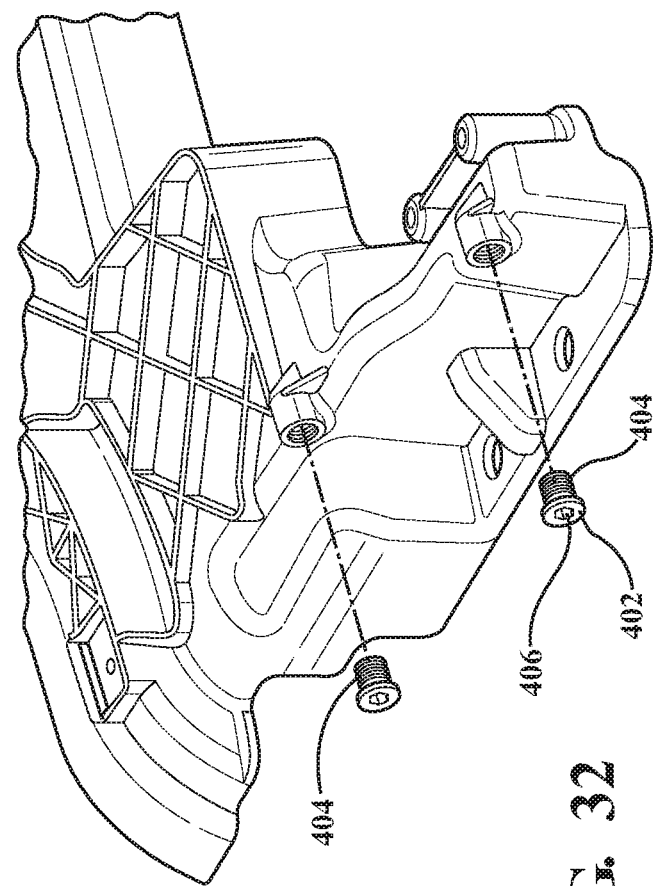
FIG. 32 is an enlarged exploded view taken of FIG. 30 depicting a connector arrangement portion including threaded inserts, according to an aspect of the present invention.
Figure 31:
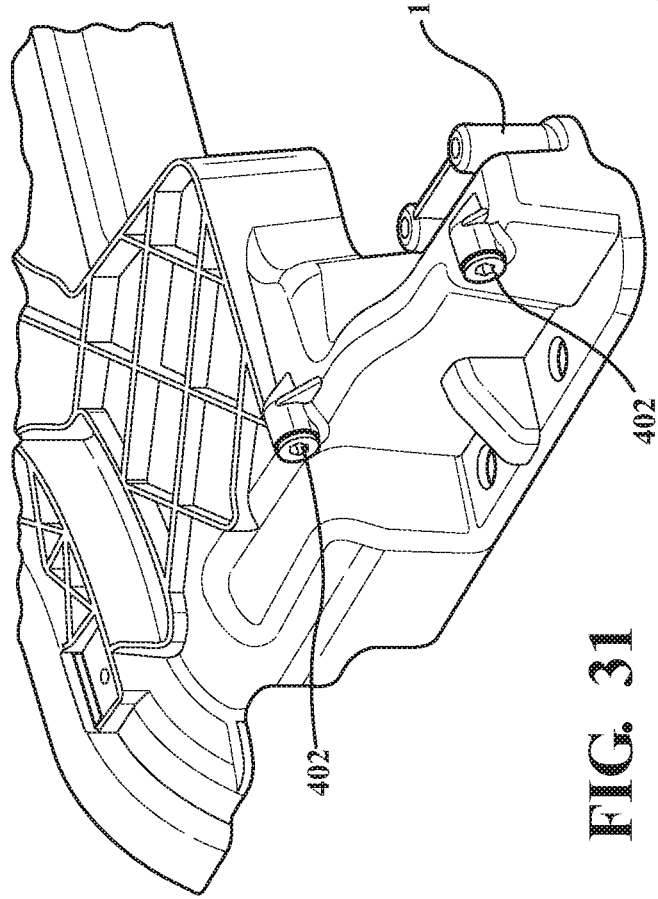
FIG. 31 is an enlarged perspective view taken of FIG. 30 depicting a connector arrangement portion, according to an aspect of the present invention.

FIG. 27 illustrates the top in a further partially open position. Continuing through the opening motion, the 2-bow stop 318 loses contact with the 2-bow guide block 316. At this position within the top cycle, gravity then overcomes the mass of the 2-bow assembly 310 and pulls the 2-bow pivot link 320, and thereby also a 2-bow 324 connected (e.g., fixedly connected) to the 2-bow pivot link 320, into the full open position. FIG. 28 illustrate the top 310 in an exemplary fully open position, thereby providing an open air driving experience. Preferably, with the top 310 in the full open position, the 2-bow guide block 316 has a hard interface to the rear header 314 (or "rear halo"), thereby creating a stop feature for the front side rail 322. Alternative interface surface(s) and alternative at least one stop features suitable for allowing/providing front side rail 322 and/or 2-bow pivot link 320 stop feature(s) are contemplated without departure from the scope of the present invention.

The front side rail 322 is operably connected to a front header 326 or "first bow". The front header 326 includes at least two latch mechanisms 328. When the assembly 310 is cycled to the closed position, the latch mechanisms 328 is selectively secured to the vehicle, e.g., vehicle windshield header. In operation, each latch is pivoted, e.g., pivoted down, until a hook engages a respective footman loop or other vehicle structure. The latch mechanism 328 is pivoted back up to complete the securement of the assembly 310 to the vehicle header in the closed position. Alternatively, the assembly 310 incorporates the latch paddle mechanism 170 described previously.

As the articulating portion 330 of the assembly 310 is cycled forward, the articulating portion 330 reaches a partially closed position. Control of the 2-bow assembly, however, is not required to close the top assembly 310 since the top cover fabric 332 is operably attached to the 2-bow 324 and to the front header 326. As the assembly 310 is cycled to the closed position, the fabric 332 pulls the bow assembly about the 2-bow pivot link 322 rotation point 333.

Each door rail 312 is operably connecting to the vehicle, e.g., to the fore/aft sport bar on both sides of the vehicle. Preferably, the door rail 312 is attached by at least one mounting surface 334, preferably, a first and second clamping surface 334 and 336 attach to the vehicle (e.g., sport bar) using at least one fastener 338, e.g., fastener, threaded fastener, bolt, threaded mushroom knob fasteners etc. through at least one aperture through the at least one mounting surface 334 and/or 336. Optionally, at least one mounting surface is provided on a rotatable member that rotates into engagement with the vehicle mounting surface, as described in greater detail previously. As explained previously in further detail, at least one mounting surface 340 on each side of the header 314 are preferably connected to the vehicle (e.g., sport bars), preferably by at least one aperture 342 through the mounting surface 340 to connect to the vehicle with at least one fastener, e.g., threaded fastener, bolt, threaded mushroom knob fasteners, at least one fastener 338, etc. Each door rail 312 is operably connecting to the rear header 314, e.g., by at least one bracket 344. Alternatively, each door rail 312 is integrally formed with the header 314.

Optionally, the assembly 310, e.g., door rails 312 thereof, include at least one attachment feature, as described previously, e.g. a first attachment portion and/or second attachment portion same or similar to as detailed previously. Optionally, as described previously, at least one accessory or other predetermined attachment is operably connectable to the first attachment portion and/or second attachment portion. By way of non-limiting example, at least one sunshade assessor, retractable sunshade, wind diffuser, mesh top, soft panel, side curtain shade, overhead shade, decorative shade, cross car member, sound bar, grab handle, lighting device, light bar, lock box, storage unit, tray, overhead barrier, vertical barrier, pet barrier, netting, roll bar or any other predetermined accessory and combinations thereof. Optionally, pivot features are molded into the rear header.

The front side rail 322 is connected at at least one first pivot point 346, preferably a single pivot point 346, e.g., provided on the rear header 314 or a bracket 344 or the door rail 312, most preferably on the bracket 344. The 2-bow pivot link 320 is connected at at least one second pivot point 348, preferably a single pivot point 348, e.g., provided on the rear header 314 or a bracket 344 or the door rail 312, most preferably on the bracket 344. It is understood that alternative pivot 346,348 locations suitable for pivoting the articulating portion depending on the application is contemplated without departure from the scope of the present invention. FIGS. 26-29 illustrate a bracket 344 connected to the assembly and providing the pivot locations for the front side rail 322 and 2-bow pivot link 320. This eliminates screw in connector arrangements. It is understood that, alternatively, molded in rear header features are provided. A screw in connector arrangement is contemplated depending on the application without departure from the scope of the present invention, e.g., providing for one or more of the respective pivotal connections to allow the top to be cycled open/closed. Alternative pivot joint mechanisms can be used suitable for cycling the top open/closed depending on the application without departing from the scope of the present invention.

The 2-bow pivot link 320 is operably connected to the 2-bow 324, which 2-bow 122 is a cross vehicle bow. Preferably, the 2-bow 324 is a fabric management bow. Most preferably, the 2-bow 324 is a fabric management bow operably coupled to the soft top cover 332 and operably configured and arranged to provide operable fabric management of the cover 332 with cycling between the closed position and the at least one open position (e.g., sunroof position). It is understood that more than one fabric management bow 324 on articulating portion 330 (or any other predetermined location(s) of the assembly 310) can be provided depending on the application without departure from the scope of the present invention. Preferably, as described in detail previously, at least one channel 123 (e.g., see FIG. 4) is provided to operably attach the cover 332 to the 2-bow 324 (or any other predetermined location(s) of the assembly 310). The at least one 2-bow 324 is preferably fastened to the 2-bow pivot link 320, e.g. at least one screw, bolt, bracket etc.

At least one additional bow 126 is operably connected to the rear header 314. Preferably, the least one additional bow 126 is a fabric management bow 126. Most preferably, the at least one additional bow 126 is a fabric management bow operably coupled to the soft top cover 332 and operably connected to the rear header 314, most preferably, fixedly connected to the rear header 314 such that the bow 126 has a fixed location. It is understood that more than one fabric management bow 126 on the rear header 314 (or any other predetermined location(s) of the assembly 310) can be provided depending on the application without departure from the scope of the present invention. Preferably, at least one channel 127 (e.g., see FIG. 4) is provided to operably attach the cover 332 to the rear header 314 (or any other predetermined location(s) of the assembly 310). The at least one additional bow 126 is preferably fastened to the rear header, e.g. at least one screw, bolt, bracket etc).

The fabric management bows 334,126 manage the top cover 332 as the assembly 310 folds to the open position. The fabric management bows also minimize fabric movement in the closed position, which alleviates wind flap noise, in addition to managing the cover 19 during articulation and in the open position.

The rear header 314 is in operable sealing engagement with the hard top, e.g., existing hard top seal, bulb seal, etc. Optionally, the assembly 310 includes a seal, e.g., at least one bulb seal, tertiary seal, foam seal, rubber seal, predetermined durometer seal, lip seal, EPDM, TPE, TPV, etc., a foam rubber, an extruded rubber, a formed/molded rubber mucket, and/or a silicone material and any combinations thereof.

A seal 350 is operably connected to the rear edge of the assembly 310 (e.g., sewn to the cover 332). Preferably, the seal 350 is a bulb seal. Alternatively, any other suitable seal is operably connected to the assembly 310, e.g., lip seal, sewn fabric lip, mucket seal, etc. It is understood that no seal is operably connected to the cover 332 or assembly 310 in accordance with another aspect of the present invention.

The left half of the soft panel top cover assembly 310 and corresponding features are substantially mirror image/symmetrical to the right half of the soft panel top cover assembly 310 and corresponding features depicted in the figures.

Referring to FIGS. 3-25 generally, the soft front cockpit cover assembly 110 is preferably a foldable and sealable with a hard top roof portion of the vehicle. The soft panel top assembly 110 is connected to a vehicle. The vehicle includes a windshield frame with side members, e.g., sport bars, extending therefrom and a cross bar or cross member operably connecting the side members substantially adjacent the rear of the driver/passenger compartment, although the top is operably adaptable for any other location contemplated. The soft panel top assembly 110 folds back to give the occupant a quick and easy open air effect, e.g., lightweight and easily operated at a short interval stop, without completely removing the soft panel top assembly 110 from the vehicle. Folding the soft panel top assembly 110 between a closed position and at least one open position is also achievable without the occupant needing to leave the vehicle and eliminates removal and storage of roof panels from the vehicle. Once cycled to the open position, the soft panel top assembly 110 also does not require strapping the assembly down to maintain open air positioning. Further, the soft panel top assembly 110 includes built in stops to set the height of the 2-bow. A 2-bow drive solution without 2-bow drive link is provided. The assembly 110 geometry generally follows the hardtop contours. The assembly 110 is in sealing engagement against the hardtop's seal(s). When closed, assembly 110 also seals with the vehicle windshield frame seal(s). Preferably, bushing and fastener arrangement is used for all of the respective pivot points and pivot joints. However, alternative suitable pivot mechanisms can be used without departing from the scope of the invention depending on the particular application.

The first bow 326 is adapted for releasable attachment to the windshield frame for opening and closing the assembly 310. The first bow 326 has at least one attachment mechanism, e.g., latches, paddles/spring/hook mechanism, or any other suitable attachment mechanism, connected thereto that have a hand actuated clamping arrangement to selectively connect to the windshield frame. The first bow is preferably molded plastic, e.g., plastic with steel reinforcement and comprises two attachment mechanisms, which when in the closed position attach to opposing features of the vehicle, e.g., metal loops, footman loops, molded parts, stamped parts, or any other vehicle interface etc, generally located under the visors of the vehicle, and when cycling to the open position, travel with the first bow. The attachment mechanisms provide for securing closure of the top to the existing windshield frame and are readily released by an operator for opening of the assembly. Optionally, at least one limiting stop is used to set the height of the articulating portion or any link thereof in the open or closed positions. In accordance with an aspect of the present invention, the cover 332 is sewn and/or adhered or otherwise attached to portions that fit within the respective channels, e.g., an extrusion is stitched or sewn and/or adhered to the cover 332. Depending on the application the extruded materials are generally polypropylene, polyethylene, flexible polyvinyl chloride, structural acrylonitrile butadiene styrene, thermoplastic elastomer of operable densities or other material suitable for making the extrusion (bulb portion and attachment flange). If more than one extruded material is used the extruded materials are compatible materials to melt bond to one another under pressure depending on the application. The rear header 314 has a plurality of attachment features for coupling to the cross member, e.g., at least one rear clamp, at least one rear clamp mounting portion 194, as described previously, and/or at least two locating brackets connected to the rear header 314, e.g., bottom thereof, by at least two fasteners, which interface with the cross member and/or hardtop to keep the rear header from lifting off the cross member in the installed position. Preferably, at least two feet 130 operably locate to the cross member or hardtop, e.g., including a lip to a leading edge. Preferably, the feet generally set the rear header height relative to the hardtop. For installation, preferably, no modification to the hardtop, no drilling of any holes in the vehicle, or changing of any existing remaining components is required. The manufactures front cockpit panels are removed and the soft panel top assembly 310 is installed. Preferably, the door rails 312 can ship separate from the rear header 314, meaning that the door rails 312 do not need to be connected to the rear header 314 for shipping through the entire supply chain or are not integrally formed with the rear header 314—thus, allowing significant decreases in shipping container size and shipping costs. Alternatively, the soft panel top assembly 310 ships in the entire supply chain, or at least part of the supply chain, as a rear header connected to or integrally formed with door rails. The rear header 314 is a rear header closeout operable to engage at least one seal existing on the hard top portion and provides a weatherproof seal, e.g., under compression with a bulb seal, lip, mucket, gasket or any other suitable seal to prevent leaks between the hard top portion and assembly 310. The assembly 310 can also include at least one seal. It is within the scope of the invention to manufacture the rear header 314 as a wireframe (e.g., bent wire frame welded together), lightweight molded plastic, or other suitable lightweight material and configurations and/or combinations thereof suitable to withstand predetermined strength requirements and to sealingly engage with the hard top portion, depending on the particular application without departing from the scope of the invention. The rear header 314 is a single piece or plurality of pieces. Preferably, the rear header 314 has plurality of lightweight molded pieces operably connected together. Most preferably, the rear header 314 is multi-piece connected together, and the door rails 312 are connected thereto at some point later in the supply chain or by the consumer. By way of non-limiting example, the manufactured door rails 312 ship unassembled to the rear header 314 to reduce shipping costs. At a final assembly facility, the door rails 312 are connected to the rear header 314 and delivered to the OEM, e.g., supporting just-in-time line requirements. This significantly reduces unit costs because the packaging shipping size is smaller to realize lower shipping rates. The assembly 310 is an aftermarket assembly and/or an original equipment manufacturer component. Preferably, a plastic retainer slides over a metal backing piece connected by a fastener to keep the cover 332 connected to the rear header 314, e.g., the cover is sandwiched, and/or secured with a plurality fasteners. Similarly, preferably, the front header 326 has a similar metal backing and plastic retainer connecting the cover 332 to the header 326, e.g., the cover is sandwiched. The cover 332 is preferably secured to the rear header 314 and/or front header 326 without snaps. The assembly 310 can also include a plurality of seals, e.g., at least one header seal, at least one door rail seal, at least one rearward door rail seal, at least one drip rail seal. The drip rail can include at least one aperture for draining water. Optionally, a seal, e.g., lip seal, bulb seal, edge seal, edge gimp, or any suitable seal, is operably connected to the cover 332 coupled to at least the rear edge surface of the rear header 314. By way of example, the lip seal is sewn and/or bonded to the cover 332 and sandwiched between the cover 332 and rear header 314 at the rear of the assembly 310. By way of non-limiting example, the seals are an open cell foam, a closed cell foam material, EPDM (ethylene propylene diene monomer), TPE (thermoplastic elastomers), TPV (thermoplastic vulcanizate), etc., a foam rubber, an extruded rubber, a formed/molded rubber mucket, and/or a silicone material. The seals are preferably foam seals, most preferably soft sponge EPDM closed cell foam. Alternatively, at least one of the pairs of seals are a rubber mucket which is more robust. It is understood that the present invention is suitable for two door and four door vehicles. A headliner material or other dampening material(s) for reducing noise in the cockpit or improved climate control is contemplated without departure from the scope of the present invention. The headliner/dampening material is operably connected on the cockpit side of the cover, e.g., sewn. Alternatively, the headliner/dampening material is inserted into at least one pocket or sandwiched between layers of cover material. The 2-door and 4-door descriptions and drawings described herein are not limiting. It is understood that any embodiment, and combinations thereof, described herein can be modified and is/are utilizable on any convertible, 2-door or 4-door vehicle. The present invention is directed to a stowable soft top assembly and operably adoptable for any vehicles and vehicle types, e.g., sliding and/or folding soft top assembly for 4-door and 2-door SUVs, all-terrain vehicles, utility task vehicles, off road vehicles, pickup trucks, Jeep™ pickups, open air pickup trucks, sport utility vehicles, any motor vehicles, etc. The left half of the soft panel top cover assembly 310 and corresponding features are substantially mirror image/symmetrical to the right half of the 310 and corresponding features depicted in the figures. The bracket provides the pivot points. Alternatively, the pivot points are integrated molded in pivot points. It is contemplated that, alternatively, the pivot points are assembled, e.g., as described previously and depicted in FIGS. 30-33. Providing at least one fabric management bow, e.g., fixed and/or articulating bow(s), is contemplated without departure from the present invention. The cover 332 is a predetermined material, e.g., soft material, fabric, twill acrylic fabric or sailcloth fabric.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A soft front cockpit cover assembly with unconnected 2-bow system for a vehicle, comprising:
    an articulating portion operably connected to a rear header, said rear header in sealing engagement with a rear roof top portion, said articulating portion having no connected 2-bow drive link;
    a cover operably connected to said articulating portion, wherein rotating the articulating portion in an aft and fore direction allows the cover to move between at least a closed position and at least an open position; and
    wherein said articulating portion further comprises a pair of front side rails and a pair of 2-bow pivot links rotatably connected to opposite sides of said rear header.

2. The soft front cockpit cover assembly of claim 1, further comprising a 2-bow operably coupled to a 2-bow pivot link, wherein said 2-bow provides fabric management.

3. The soft front cockpit cover assembly of claim 2, further comprising at least one additional bow that is a cross car bow providing fabric management.

4. The soft front cockpit cover assembly of claim 1, wherein said articulating portion further comprises a pair of front side rails each including at least one 2-bow guide block and a pair of 2-bow pivot links each including at least one 2-bow stop, wherein cycling said articulating portion causes said stop and block to contact thereby lifting and rotating said 2-bow pivot link into said open position without the use of a 2-bow drive link.

5. The soft front cockpit cover assembly of claim 1, wherein said articulating portion further comprises a pair of front side rails and a pair of 2-bow pivot links each operably coupled to a respective cable system, wherein cycling said articulating portion causes said cable system to operably lift and rotate said 2-bow pivot link into said open position without the use a 2-bow drive link.

6. The soft front cockpit cover assembly of claim 1, further comprising a plurality of screw-in connector arrangements each including a threaded insert for connecting the front side rail and 2-bow pivot link with a shoulder bolt, respectively.

7. A soft front cockpit cover assembly with unconnected 2-bow system adapted for a vehicle, comprising:
    an articulating portion operably connected to a frame portion and adapted for sealing engagement with a rear top portion, said articulating portion having no connected 2-bow drive link, said articulating portion further comprising a pair of front side rails connected to a front header and a pair of 2-bow pivot links, said pair of front side rails and pair of 2-bow pivot links rotatably connected to a rear header;
    a cover operably connected to the articulating portion, where moving the articulating portion allows the cover to move between at least a closed position and at least an open position; and
    a 2-bow stop attached to said 2-bow pivot link and a 2-bow guide block attached to said front side rail, wherein said 2-bow stop rests on said 2-bow guide block to control a 2-bow height when in the close position.

8. The soft front cockpit cover assembly of claim 7, further comprising a plurality of attachment portions operable to selectively attach at least one accessory device.

9. The soft front cockpit cover assembly of claim 8, wherein said at least one accessory device is selected from the group consisting of at least one sunshade accessory, retractable sunshade, wind diffuser, mesh top, soft panel, side curtain shade, overhead shade, decorative shade, cross car member, sound bar, grab handle, lighting device, light bar, lock box, storage unit, tray, overhead barrier, vertical barrier, pet barrier, netting, roll bar and any combination thereof.

10. The soft front cockpit cover assembly of claim 7, further comprising at least one latch mechanism comprising a latch that is biased by a spring, said latch operably engaging and holding to a vehicle part when a latch handle is compressed.

11. The soft front cockpit cover assembly of claim 7, wherein at least two latch mechanisms are connected to a front header of said soft front cockpit cover assembly for selectively attaching to a windshield frame.

12. The soft front cockpit cover assembly of claim 7, further comprising a plurality of screw-in connector arrangements each including a threaded insert for connecting the front side rail and 2-bow pivot link to the rear header, respectively.

13. The soft front cockpit cover assembly of claim 7, further comprising at least one pair of door rails with a plurality of attachment surfaces operably adapted to connect to the vehicle adjacent a roof top opening of the vehicle each with at least one fastener.

14. The soft front cockpit cover assembly of claim 7, further comprising a 2-bow that is a fabric management bow connected to the 2-bow pivot link.

15. The soft front cockpit cover assembly of claim 7, wherein as the articulating portion rotates to an open position, said 2-bow guide block maintains contact with the 2-bow stop to lift and rotate the 2-bow pivot link in the beginning of cycling into the open position.

16. The soft front cockpit cover assembly of claim 7, wherein the cover pulls the articulating portion about a 2-bow pivot link rotation point to cycle the articulating portion to the closed position.

17. A soft front cockpit cover assembly for a vehicle, comprising:
  an articulating portion operable, said articulating portion having no connected 2-bow drive link;
  at least one first guide connected to a front rail;
  at least one second guide connected to a 2-bow pivot link;
  a rear header in sealing engagement with a rear roof top portion, said front rail and 2-bow pivot link rotatably connected to said rear header;
  a cover operably connected to said articulating portion to selectively close off a roof top opening of the vehicle,
  wherein said at least one first and second guides contact to set the height of said 2-bow link when the articulating portion is in a closed position; and
  wherein as the articulating portion rotates to an open position, one of said guides maintains contact with the other of said guides to lift and rotate the 2-bow pivot link to the open position without a drive link.

* * * * *